United States Patent
Ahmad et al.

(10) Patent No.: US 12,482,254 B2
(45) Date of Patent: Nov. 25, 2025

(54) METHOD OF AND SYSTEM FOR PERFORMING OBJECT RECOGNITION IN DATA ACQUIRED BY ULTRAWIDE FIELD OF VIEW SENSORS

(71) Applicant: THALES CANADA INC., Ottawa (CA)

(72) Inventors: Ola Ahmad, Montreal (CA); Freddy Lecue, Montreal (CA)

(73) Assignee: THALES CANADA INC., Ottawa (CA)

( * ) Notice: Subject to any disclaimer, the term of this patent is extended or adjusted under 35 U.S.C. 154(b) by 285 days.

(21) Appl. No.: 18/546,355

(22) PCT Filed: Feb. 11, 2022

(86) PCT No.: PCT/IB2022/051254
§ 371 (c)(1),
(2) Date: Aug. 14, 2023

(87) PCT Pub. No.: WO2022/180479
PCT Pub. Date: Sep. 1, 2022

(65) Prior Publication Data
US 2024/0153261 A1    May 9, 2024

Related U.S. Application Data

(60) Provisional application No. 63/153,114, filed on Feb. 24, 2021.

(51) Int. Cl.
*G06V 10/82*    (2022.01)
*G06V 10/44*    (2022.01)
*G06V 10/75*    (2022.01)

(52) U.S. Cl.
CPC ............ *G06V 10/82* (2022.01); *G06V 10/454* (2022.01); *G06V 10/76* (2022.01)

(58) Field of Classification Search
CPC ...... G06V 10/76; G06V 10/82; G06V 10/454; G06V 20/56; G06N 3/0464
See application file for complete search history.

(56) References Cited

PUBLICATIONS

Deng, et al. (Object detection on panoramic images based on deep learning). (Year: 2017).*

(Continued)

*Primary Examiner* — Daniel G Mariam
(74) *Attorney, Agent, or Firm* — Studebaker Brackett PLLC

(57) ABSTRACT

There is provided a method and system for training an object recognition machine learning model to perform object recognition in data acquired by ultrawide field of view (UW FOV) sensors to thereby obtain a distortion-aware object recognition model. The object recognition model comprises convolution layers each associated with a set of kernels. During training on a UW FOV labelled training dataset, deformable kernels are learned in a manifold space, mapped back to Euclidean space and used to perform convolutions to obtain output feature maps which are used to perform object recognition predictions. Model parameters of the distortion-aware object recognition model may be transferred to other architectures of object recognition models, which may be further compressed for deployment on embedded systems such as electronic devices on board autonomous vehicles.

26 Claims, 10 Drawing Sheets

(56) References Cited

PUBLICATIONS

Zhao, et al. (Distortion-aware CNNs for spherical images). (Year: 2018).*

Playout et al., Clement, "Adaptable Deformable Convolutions For Semantic Segmentation Of Fisheye Images In Autonomous Driving Systems," ArXiv preprint arXiv:2102.10191 (2021), Feb. 23, 2021, pp. 1-10.

Qiao et al., Xinshu, "Action Recognition with Spatial-Temporal Representation Analysis Across Grassmannian Manifold and Euclidean Space," 2018 25th IEEE International Conference on Image Processing (ICIP), IEEE, 2018, pp. 3448-3452.

International Search Report and Written Opinion issued in corresponding International Application No. PCT/IB2022/051254, mailed Mar. 22, 2022, pp. 1-7, Canadian Intellectual Property Office, Quebec, Canada.

Renata Khasanova et al., "Graph-Based Classification of Omnidirectional Images", arxiv.org, Cornell University Library, 201 Olin Library Cornell University Ithaca, NY 14853, Jul. 26, 2017, total 10 pages.

Chami Ines et al., "Hyperbolic Graph Convolutional Neural Networks", 33rd Conference on Neural Information Processing Systems, [Online] Jan. 1, 2019, pp. 1-12, URL: https://proceedings.neurips.cc/paper/2019/file/0415740eaa4d9decbc8da001d3fd805f-Paper.pdf.

The extended European search report issued by the European Patent Office on Dec. 17, 2024, which corresponds to European Patent Application No. 22759032.0-1207 and is related to U.S. Appl. No. 18/546,355, all pages.

* cited by examiner

METHOD OF AND SYSTEM FOR PERFORMING OBJECT RECOGNITION IN DATA ACQUIRED BY ULTRAWIDE FIELD OF VIEW SENSORS

CROSS-REFERENCE TO RELATED APPLICATIONS

This patent application is a U.S. National Phase of International Application No. PCT/IB2022/051254, filed on Feb. 11, 2022, which claims priority of U.S. patent application No. 63/153,114 entitled "Method of and system for performing object recognition in data acquired by ultrawide field of view sensors" that was filed on Feb. 24, 2021.

FIELD

The present technology relates to artificial intelligence, machine learning (ML) and computer vision in general and more specifically to methods and systems for performing object recognition in data acquired by ultrawide field of view sensors such as fisheye cameras.

BACKGROUND

There is an incremental need for fisheye cameras in many modern computer vision applications, including robotics, video surveillance, augmented reality, and more particularly autonomous driving vehicles. A fisheye camera has an ultrawide field of view (FOV) lens that could expand to 180 degrees to provide a large coverage of the scene in front of the camera. This makes large FOV cameras (i.e., fisheye) important and useful for example in commercial autonomous driving systems as some systems require a 360°-surround view. Common systems are occupied with many narrow FOV cameras to cover the whole environment. Modern systems are now investigating large FOV cameras to capture more relevant information (pedestrians, obstacles, etc.) of the system's surroundings, to decrease the power consumption and load burden on the system, and to handle complex use cases such as emergency-braking and obstacle detection.

However, fisheye cameras provide distorted images. The geometric distortion restrains the use of existing artificial intelligence solutions in image recognition and scene understanding.

Image rectification, or distortion correction, is a technique that has been used as a pre-processing step before performing object recognition in ultrawide field of view (UW FOV) images. Such techniques consist in using 2D/3D calibration patterns (e.g., checkboard or ruler) and match their positions in multiple images obtained from different viewpoints [1]-[4]. However, image rectification techniques rely on manual operations and pre-prepared configurations, such as measuring the real distance from the camera and knowing the real pixel size (resolution) and cannot be generalized to real-world problems. Alternative solutions use automatic self-calibration techniques but are also based on hand-engineering feature extraction.

Other solutions to image rectification apply deep convolutional neural networks (CNNs) directly on fisheye images. However, such solutions are confronted with the radial distortion underlying fisheye cameras that breaks down the translation invariance property of CNNs, which leads to inaccurate feature extraction. Recent solutions have attempted to adapt CNN and convolution filters on wide FOV cameras but were limited to 360° FOV image, which is not strictly a fisheye image. Further, most of the existing solutions are not deployable in real-world applications.

There is a need for methods and systems that can handle ultrawide field of view distortions while also taking into account computation needs and memory costs for deployment in real-world applications.

SUMMARY

It is an object of the present technology to ameliorate at least some of the inconveniences present in the prior art. One or more embodiments of the present technology may provide and/or broaden the scope of approaches to and/or methods of achieving the aims and objects of the present technology.

One or more embodiments of the present technology have been developed based on developers' appreciation that although CNNs are still being used so far, image rectification itself has some limitations, as approaches that are either based on CNN or geometric projections are the first steps for any image recognition task (classification, object detection, semantic segmentation, etc.). However, the accuracy of the image recognition task is sensitive and depends on the accuracy and robustness of the image rectification and quality of the distortion correction that performed beforehand. On the other hand, geometric mapping from large FOVs of fisheye images to rectilinear (or undistorted) space leads to loss of FOV and accordingly loss of scene information [14]. Further, for autonomous vehicle applications, there is a burden and high complexity in building a fisheye image recognition pipeline by integrating one CNN for distortion correction, and a second (pre-trained) CNN for image recognition. Thus, building one CNN architecture to deal with two problems in an end-to-end manner may be difficult to generalizable to other recognition tasks.

Further, training CNNs directly on fisheye data to learn fisheye features and using transfer learning techniques may not always be accurate because the translation invariance assumption of standard CNNs leads to the CNNs sharing the same features (CNN weights) over all pixels. But the non-linearity and spatially varying distortion fundamentally break down this assumption [14], [17]. Developers have thus appreciated that CNNs should account for the spatial changes of fisheye geometry.

Developers of the present technology have theorized that instead of looking for distortion correction of ultrawide field of view data, the distortion could be treated as part of the image's geometric formation and deep learning convolution models could be adapted to work directly on ultrawide field of view (UW FOV) sensors which may have a FOV between 180 degrees and 360 degrees.

Thus, one or more embodiments of the present technology are directed to a method of and a system for performing object recognition in data acquired by ultrawide field of view sensors.

A distortion-aware object recognition model provided by one or more embodiments of the present technology may learn features from raw fisheye images without the need for pre-processing steps such as calibration, and its learned features may be transferred to other machine learning model architectures used for object detection and instance segmentation from perspective images. Further, such a distortion-aware object recognition model may be compressed to be memory and computationally efficient, hence deployable on embedded systems. In some aspects, the distortion-aware object recognition model may be adapted to capture the semantic relationship between objects detected from multi fisheye sensors around a vehicle to enable robust environmental awareness and monitoring.

In accordance with a broad aspect of the present technology, there is provided a method for providing a trained deep neural network to extract features from images acquired by ultrawide field of view (FOV) sensors, the method is executed by a processor. The method comprises: obtaining a deep neural network, the deep neural network includes a set of convolutional layers each associated with respective kernels, the set of convolution layers includes at least one convolution layer associated with a deformable kernel, obtaining a training dataset includes a plurality of ultrawide field of view images, each of the plurality of ultrawide field of view images is associated with at least one respective object class label, training the deep neural network to perform object recognition on the training dataset to thereby obtain a trained deep neural network, said training includes: extracting, by using at least one of the set of convolution layers, for a given ultrawide field of view image, a set of features indicative of at least spatial relations in the given ultrawide field of view image, projecting the set of features into a manifold space to obtain a set of projected features, generating, by using a non-Euclidian convolution layer in manifold space on the set of projected features, a set of geometric features indicative of ultrawide field of view image properties in manifold space, generating, by using at least another convolution layer of the set of convolution layers and the set of geometric features, a set of distorted features indicative of ultrawide field of view image properties in Euclidian space, generating, for the given ultrawide field of view image, by using the set of distorted features, at least one object class prediction, and updating, based on the at least one object class prediction and the at least one respective object class label, at least a portion of the deep neural network includes the deformable kernel to obtain a learned deformable kernel, providing the trained deep neural network, the trained deep neural network includes the set of convolutional layers with the at least one convolution layer associated with the learned deformable kernel.

In one or more embodiments of the method, object recognition comprises semantic segmentation, the at least one respective object class label comprises a respective segmentation map, the at least one object class prediction comprises a pixel-wise class prediction.

In one or more embodiments of the method, the manifold space comprises a hyperbolic space.

In one or more embodiments of the method, the projecting of the set of features into a manifold space to obtain a set of projected features comprises using a Poincaré ball model.

In one or more embodiments of the method, the method further comprises, after the generating, by using the non-Euclidian convolution layer in the manifold space on the set of projected features, the set of geometric features indicative of ultrawide field of view image properties in the manifold space: projecting back the set of geometric features into Euclidian space to obtain deformable kernel values, and the generating, by using at least another convolution layer of the set of convolution layers and the set of geometric features, the set of distorted features indicative of ultrawide field of view image properties in Euclidian space comprises using the deformable kernel values to generate the set of distorted features.

In one or more embodiments of the method, the method further comprises, prior to the extracting, for the given ultrawide field of view image, by using at least one the set of convolution layers, the set of features: generating, using the given ultrawide field of view image, a graph representation thereof to be used to extract the set of features therefrom.

In one or more embodiments of the method, the updating comprises using backpropagation.

In one or more embodiments of the method,
updating comprises using a reconstruction loss as an objective function.

In one or more embodiments of the method, the deep neural network has an encoder-decoder architecture.

In one or more embodiments of the method, the plurality of ultrawide field of view images comprise a field of view between 180 degrees and 360 degrees.

In accordance with a broad aspect of the present technology, there is provided a method of training a further deep neural network to perform image recognition according to claim 10. The method comprises: obtaining respective learned kernels and the learned deformable kernel, obtaining the further deep neural network, fitting the further deep neural network by using the respective learned kernels and the learned deformable kernel to obtain a fitted deep neural network, obtaining another plurality of ultrawide field of view images, each of the another plurality of ultrawide field of view images is labelled with an object recognition label, training the fitted deep neural network to perform image recognition on the another plurality of ultrawide field of view images to thereby obtain another trained deep neural network adapted to perform image recognition on ultrawide field of view images.

In one or more embodiments of the method, the fitting comprises using bilinear interpolation.

In one or more embodiments of the method, the image recognition comprises one of object detection and semantic segmentation.

In accordance with a broad aspect of the present technology, there is provided a system for providing a trained deep neural network to extract features from images acquired by ultrawide field of view (FOV) sensors, the system is executed by a processor. The system comprises a processor, a non-transitory storage medium operatively connected to the processor, the non-transitory storage medium includes computer-readable instructions, the processor, upon executing the instructions, is configured for: obtaining a deep neural network, the deep neural network includes a set of convolutional layers each associated with respective kernels, the set of convolution layers includes at least one convolution layer associated with a deformable kernel, obtaining a training dataset includes a plurality of ultrawide field of view images, each of the plurality of ultrawide field of view images is associated with at least one respective object class label, training the deep neural network to perform object recognition on the training dataset to thereby obtain a trained deep neural network, the training includes: extracting, by using at least one of the set of convolution layers, for a given ultrawide field of view image, a set of features indicative of at least spatial relations in the given ultrawide field of view image, projecting the set of features into a manifold space to obtain a set of projected features, generating, by using a non-Euclidian convolution layer in manifold space on the set of projected features, a set of geometric features indicative of ultrawide field of view image properties in manifold space, generating, by using at least another convolution layer of the set of convolution layers and the set of geometric features, a set of distorted features indicative of ultrawide field of view image properties in Euclidian space, generating, for the given ultrawide field of view image, by using the set of distorted features, at least one object class prediction, and updating, based on the at least one object class prediction and the at least one respective object class label, at least a portion of the deep neural network includes the deformable kernel to obtain a learned deformable kernel, providing the trained deep neural network, the trained deep neural network includes the set of convolutional layers with the at least one convolution layer associated with the learned deformable kernel.

In one or more embodiments of the system, the object recognition comprises semantic segmentation, the at least one respective object class label comprises a respective segmentation map, the at least one object class prediction comprises a pixel-wise class prediction.

In one or more embodiments of the system, the manifold space comprises a hyperbolic space.

In one or more embodiments of the system, the projecting of the set of features into a manifold space to obtain a set of projected features comprises using a Poincaré ball model.

In one or more embodiments of the system, the processor is further configured for, after the generating, by using the non-Euclidian convolution layer in the manifold space on the set of projected features, the set of geometric features indicative of ultrawide field of view image properties in the manifold space: projecting back the set of geometric features into Euclidian space to obtain deformable kernel values, and the generating, by using at least another convolution layer of the set of convolution layers and the set of geometric features, the set of distorted features indicative of ultrawide field of view image properties in Euclidian space comprises using the deformable kernel values to generate the set of distorted features.

In one or more embodiments of the system, the processor is further configured for, prior to the extracting, for the given ultrawide field of view image, by using at least one the set of convolution layers, the set of features: generating, using the given ultrawide field of view image, a graph representation thereof to be used to extract the set of features therefrom.

In one or more embodiments of the system, the updating comprises using backpropagation.

In one or more embodiments of the system, the updating comprises using a reconstruction loss as an objective function.

In one or more embodiments of the system, the deep neural network has an encoder-decoder architecture.

In one or more embodiments of the system, the plurality of ultrawide field of view images comprise a field of view between 180 degrees and 360 degrees.

In accordance with a broad aspect of the present technology, there is provided a system of training a further deep neural network to perform image recognition according to claim 22. the system comprises: obtaining respective learned kernels and the learned deformable kernel, obtaining the further deep neural network, fitting the further deep neural network by using the respective learned kernels and the learned deformable kernel to obtain a fitted deep neural network, obtaining another plurality of ultrawide field of view images, each of the another plurality of ultrawide field of view images is labelled with an object recognition label, training the fitted deep neural network to perform image recognition on the another plurality of ultrawide field of view images to thereby obtain another trained deep neural network adapted to perform image recognition on ultrawide field of view images.

In one or more embodiments of the system, the fitting comprises using bilinear interpolation.

In one or more embodiments of the system, the image recognition comprises one of object detection and semantic segmentation.

In the context of the present specification, a "server" is a computer program that is running on appropriate hardware and is capable of receiving requests (e.g., from electronic devices) over a network (e.g., a communication network), and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expressions "at least one server" and "a server".

In the context of the present specification, an "electronic device" is any computing apparatus or computer hardware that is capable of running software appropriate to the relevant task at hand. Thus, some (non-limiting) examples of electronic devices include general purpose personal computers (desktops, laptops, netbooks, etc.), mobile computing devices, smartphones, and tablets, and network equipment such as routers, switches, and gateways. It should be noted that an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein. In the context of the present specification, a "client device" refers to any of a range of end-user client electronic devices, associated with a user, such as personal computers, tablets, smartphones, and the like.

In the context of the present specification, the expression "computer readable storage medium" (also referred to as "storage medium" and "storage") is intended to include non-transitory media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the expression "communication network" is intended to include a telecommunications network such as a computer network, the Internet, a telephone network, a Telex network, a TCP/IP data network (e.g., a WAN network, a LAN network, etc.), and the like. The term "communication network" includes a wired network or direct-wired connection, and wireless media such as acoustic, radio frequency (RF), infrared and other wireless media, as well as combinations of any of the above.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
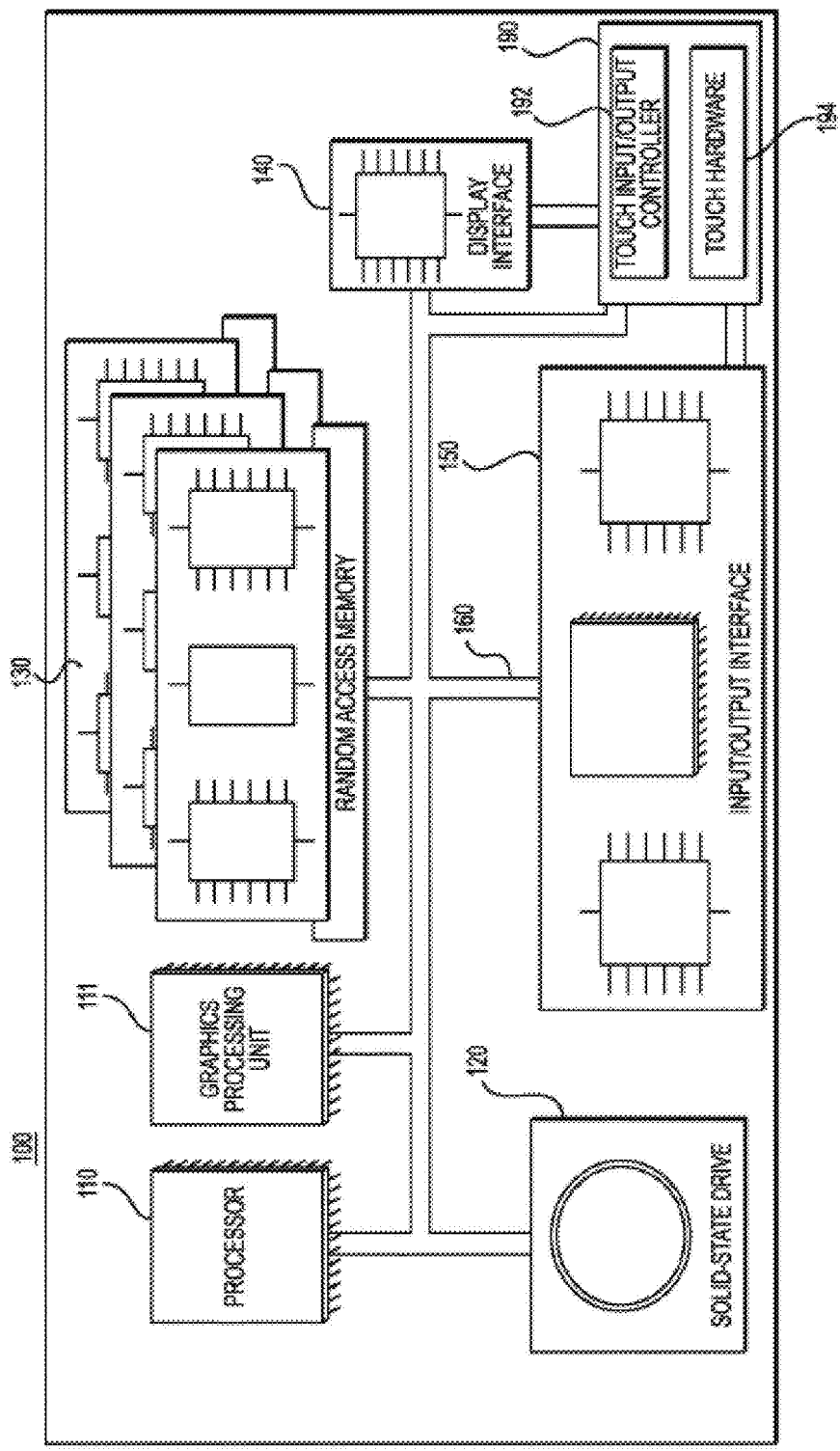
FIG. 1 depicts a schematic diagram of an electronic device in accordance with one or more non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In one or more non-limiting embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Electronic Device

Referring to FIG. 1, there is shown an electronic device 100 suitable for use with some implementations of the present technology, the electronic device 100 comprising various hardware components including one or more single or multi-core processors collectively represented by processor 110, a graphics processing unit (GPU) 111, a solid-state drive 120, a random access memory 130, a display interface 140, and an input/output interface 150.

Communication between the various components of the electronic device 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In one or more embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In one or more embodiments, the input/output interface 150 may be connected to a keyboard (not shown), a mouse (not shown) or a trackpad (not shown) allowing the user to interact with the electronic device 100 in addition or in replacement of the touchscreen 190.

According to implementations of the present technology, the solid-state drive 120 stores program instructions suitable for being loaded into the random-access memory 130 and executed by the processor 110 and/or the GPU 111 for providing a trained deep neural network adapted to perform object recognition in data acquired by ultrawide field of view sensors. For example, the program instructions may be part of a library or an application.

The electronic device 100 may be implemented as a server, a desktop computer, a laptop computer, a tablet, a smartphone, a personal digital assistant or any device that may be configured to implement the present technology, as it may be understood by a person skilled in the art.

Networked Computer Environment

Figure 2:
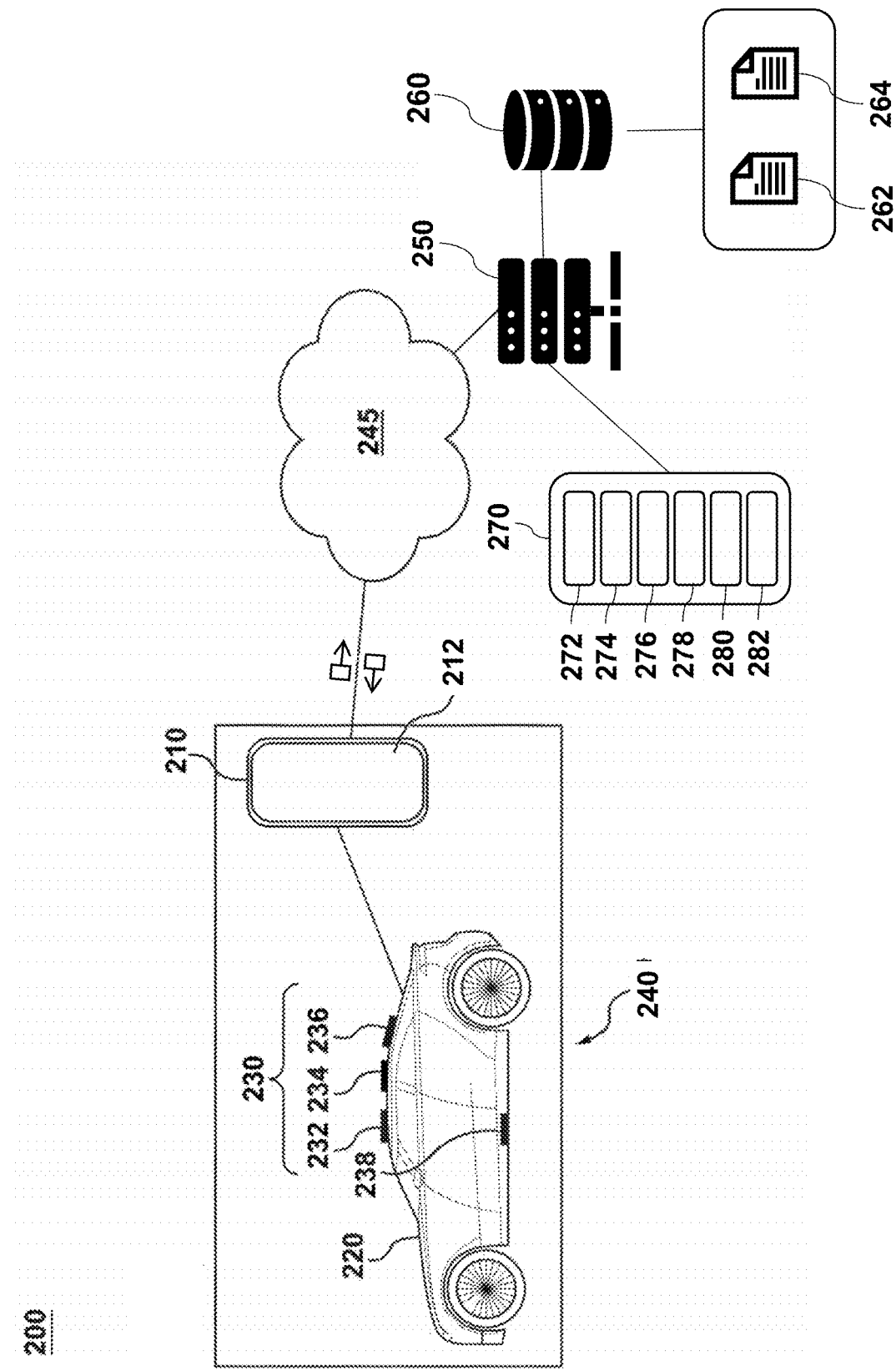
FIG. 2 depicts a schematic diagram of a networked computer environment in accordance with one or more non-limiting embodiments of the present technology.

Referring to FIG. 2, there is shown a schematic diagram of a networked computer environment 200, the networked computer environment 200 being suitable for implementing one or more non-limiting embodiments of the present technology. It is to be expressly understood that the networked computer environment 200 as shown is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the networked computer environment 200 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 200 may provide in certain instances simple implementations of the present technology, and that where such is the case they have been presented in this manner as an aid to understanding. As persons skilled in the art would understand, various implementations of the present technology may be of a greater complexity.

The networked computer environment 200 comprises an electronic device 210 associated with a vehicle 220, or associated with a user (not depicted) who can operate the vehicle 220, a server 250 in communication with the electronic device 210 via a communication network 245 (e.g. the Internet or the like, as will be described in greater detail herein below). Optionally, the networked computer environment 200 can also include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

Vehicle

The vehicle 220 to which the electronic device 210 is associated may comprise any leisure or transportation vehicle such as a private or commercial car, truck, motorbike or the like. The vehicle may be user operated or a driver-less vehicle. It should be noted that specific parameters of the vehicle 220 are not limiting, these specific parameters including: vehicle manufacturer, vehicle model, vehicle year of manufacture, vehicle weight, vehicle dimensions, vehicle weight distribution, vehicle surface area, vehicle height, drive train type (e.g. 2× or 4×), tire type, brake system, fuel system, mileage, vehicle identification number, and engine size.

The implementation of the electronic device 210 is not particularly limited, but as an example, the electronic device 210 may be implemented as a vehicle engine control unit, a vehicle CPU and/or GPU, a vehicle navigation device (e.g. TomTom™, Garmin™), a tablet, a personal computer built into the vehicle 220 and the like. Thus, it should be noted that the electronic device 210 may or may not be permanently associated with the vehicle 220. Additionally or alternatively, the electronic device 210 can be implemented in a wireless communication device such as a mobile telephone (e.g. a smart-phone or a radio-phone). In certain embodiments, the electronic device 210 has a display 212.

The electronic device 210 may comprise some or all of the components of the computer system 100 depicted in FIG. 1. In certain embodiments, the electronic device 210 is on-board computer device and comprises the processor 110, the GPU 111, solid-state drive 120 and the memory 130. In other words, the electronic device 210 comprises hardware and/or software and/or firmware, or a combination thereof, for determining the presence of an object around the vehicle 220, as will be described in greater detail below.

The electronic device 210 further comprises or has access to a plurality of sensors 230. The plurality of sensors 230 comprises a first set of sensors 232 (only one depicted in FIG. 2) configured to capture an image of a surrounding area 240. It will be appreciated that the first set of sensors 232 comprises at least one camera configured to capture ultra-wide field of view images with a field of view between 180 and 360 degrees. The first set of sensors 232 is operatively coupled to the processor 110 for transmitting the so-captured information to the processor 110 for processing thereof.

In one or more embodiments, the plurality of sensors 230 may comprise a second sensor 234 configured to capture LIDAR point cloud of the surrounding area 240. as will be described in greater detail herein below. Additionally or alternatively, the electronic device 210 further comprises or has access to a third sensor 236 configured to capture RADAR data of the surrounding area and operatively coupled to the processor 110 for transmitting so-captured information to the processor 110 for processing thereof.

Plurality of Sensors

First Set of Sensors

In a specific non-limiting example, the first set of sensors 232 may comprise an ultrawide field of view (UW FOV) camera. How the camera is implemented is not particularly limited. For example, in one specific non-limiting embodiments of the present technology, the camera can be implemented as a mono camera with resolution sufficient to detect objects at pre-determined distances of up to about 30 m (although cameras with other resolutions and ranges are within the scope of the present disclosure). The camera can be mounted on an interior, upper portion of a windshield of the vehicle 220, but other locations are within the scope of the present disclosure, including on a back window, side windows, front hood, rooftop, front grill, or front bumper of the vehicle 220. In some non-limiting embodiments of the present technology, one or more of the first set of sensors 232 can be mounted in a dedicated enclosure (not depicted) mounted on the top of the vehicle 220.

In some non-limiting embodiments of the present technology, the first set of sensors 232 may have a sufficient number of cameras to capture a surrounding/panoramic image of the surrounding areas 240.

A camera (or one or more cameras that make up the implementation of the first set of sensors 232) may be configured to capture a pre-determined portion of the surrounding area 240 around the vehicle 220. In one or more embodiments, a given camera is configured to capture an image (or a series of images) that represent approximately 90 degrees of the surrounding area 240 around the vehicle 220 that are along a movement path of the vehicle 220.

An UW FOV camera (or one or more UW FOV cameras that make up the implementation of the first set of sensors 232) is configured to capture an image (or a series of images) that represent approximately 180 degrees of the surrounding area 240 around the vehicle 220 that are along a movement path of the vehicle 220. In yet additional embodiments of the present technology, the camera is configured to capture an image (or a series of images) that represent approximately 360 degrees of the surrounding area 240 around the vehicle 220 that are along a movement path of the vehicle 220 (in other words, the entirety of the surrounding area around the vehicle 220).

It will be appreciated that in the context of the present technology, an UW FOV camera may be equipped with a lens that enables capturing between 180 degrees and 360 degrees of the surrounding area 240 around the vehicle 220 that are along a movement path of the vehicle 220.

Second Sensor

In a specific non-limiting example, the second sensor 234 comprises a Light Detection and Ranging (LIDAR) instrument. The second sensor 234 can be implemented as a plurality of LIDAR based sensor, such as three for example or any other suitable number. In some embodiments of the present technology, the second sensor 234 (whether implemented as a single LIDAR based sensor or multiple LIDAR based sensors) can be housed in the above-mentioned enclosure (not separately depicted) located on the roof of the vehicle 220. In alternative embodiments, the second sensor 234 may be optional.

Third Sensor

In a specific non-limiting example, the third sensor 236 comprises a RAdio Detection and Ranging (RADAR) instrument.

In one or more embodiments, the third sensor 236 may comprise long-range, medium-range and short-range RADAR sensors. As a non-limiting example, the long-range RADAR sensor may be used for adaptive cruise control, automatic emergency braking, and forward collision warning, while the medium and short-range RADAR sensors may be used for park assist, cross-traffic alert, junction assist, and blind side detection.

Other Sensors

The vehicle 220 further comprises or has access to other sensors 238. The other sensors 238 include one or more of: an inertial measurement unit (IMU), a Global Navigation Satellite System (GNSS) instrument, ground speed RADARs, ultrasonic SONAR sensors, odometry sensors including accelerometers and gyroscopes, mechanical tilt sensors, magnetic compass, and other sensors allowing operation of the vehicle 220.

As a non-limiting example, the IMU may be fixed to the vehicle 220 and comprise three gyroscopes and three accelerometers for providing data on the rotational motion and linear motion of the vehicle 220, which may be used to calculate motion and position of the vehicle 220.

This calibration can be executed during the manufacturing and/or set up of the vehicle 220. Or at any suitable time thereafter or, in other words, the calibration can be executed during retrofitting the vehicle 220 with the first set of sensors 232, the second sensor 234, and the third sensor 236 in accordance with the one or more embodiments of the present technology contemplated herein. Alternatively, the calibration can be executed during equipping the vehicle 220 with the first set of sensors 232 and the second sensor 234, and the third sensor 236 in accordance with the one or more embodiments of the present technology contemplated herein.

Communication Network

In some embodiments of the present technology, the communication network 245 is the Internet. In alternative non-limiting embodiments, the communication network can be implemented as any suitable local area network (LAN), wide area network (WAN), a private communication network or the like. It should be expressly understood that implementations for the communication network are for illustration purposes only. A communication link (not separately numbered) between the electronic device 210 and the communication network 245 is implemented will depend inter alia on how the electronic device 210 is implemented. Merely as an example and not as a limitation, in those embodiments of the present technology where the electronic device 210 is implemented as a wireless communication device such as a smartphone or a navigation device, the communication link can be implemented as a wireless communication link. Examples of wireless communication links include, but are not limited to, a 3G communication network link, a 4G communication network link, a 5G communication link, and the like. The communication network 245 may also use a wireless connection with the server 250.

Server

The server 250 is configured to inter alia: (i) access or execute a set of machine learning (ML) models 270; (ii) train a first object recognition model 272 on an ultrawide field of view (UW FOV) training dataset 264 to thereby obtain a first distortion-aware object recognition model 274; (iii) transfer and fit learned model parameters from the first distortion-aware object recognition model 274 to a second object recognition model 276 to thereby obtain a second distortion-aware object recognition model 278; (iv) compress one of the first distortion-aware object recognition model 274 and the second distortion-aware object recognition model 278 to thereby obtain a compressed distortion-aware object recognition model 280 for deployment on embedded systems; and (v) deploy the compressed object recognition model 280 to perform 360-degree visual scene understanding using UW FOV sensor data captured onboard a vehicle.

How the server 250 is configured to do so will be explained in more detail herein below.

In some embodiments of the present technology, the server 250 is implemented as a conventional computer server and may comprise some or all of the components of the computer system 1 of FIG. 1. In one non-limiting example, the server 112 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server is a single server. In alternative non-limiting embodiments of the present technology (not shown), the functionality of the server 250 may be distributed and may be implemented via multiple servers.

In some non-limiting embodiments of the present technology, the processor 110 of the electronic device 210 can be in communication with the server 250 to receive one or more updates. The updates can be, but are not limited to, software updates, map updates, routes updates, weather updates, and the like. In some embodiments of the present technology, the processor 110 can also be configured to transmit to the server 250 certain operational data, such as routes traveled, traffic data, performance data, and the like. Some or all data transmitted between the vehicle 220 and the server 250 may be encrypted and/or anonymized.

The processor 110 of the server 250 has access to a set of ML models 270 comprising one or more ML models. In one or more embodiments, the processor 110 is configured to execute the set of ML models 270.

Machine Learning Models

The set of ML models 270 comprises inter alia the first object recognition model 272, the first distortion-aware object recognition model 274, the second object recognition model 276, the second distortion-aware object recognition model 278, the compressed distortion-aware object recognition model 280, and the scene understanding distortion-aware object recognition model 282.

The first object recognition model 272 is a deep neural network machine learning model. In one or more embodiments, the first object recognition model 272 is a deep neural network comprising at least one convolution layer. As a non-limiting example, the first object recognition model 272 may be a CNN having an encoder-decoder architecture.

In one or more embodiments, the first object recognition model 272 is a pretrained model. For computer vision tasks, the first object recognition model 272 may be an object detection model (i.e. performing object localization via bounding boxes and object classification of the localized objects in the bounding boxes), a semantic segmentation model (pixel-wise object classification), and an instance segmentation model (pixel-wise object classification with each object being considered as a separate instance).

As a non-limiting example, the first object recognition model 272 may be implemented based on AlexNet, Inception, VGG, ResNet, and DeepLabV3+.

In the context of the present technology, the first object recognition model 272 is initialized with at least one non-Euclidian convolution layer and trained to obtain a first distortion-aware object recognition model 274 which is configured to or operable to perform object recognition in data acquired by UW FOV sensors, such as data acquired by the first set of sensors 232 of the vehicle 220.

In one or more embodiments, the model parameters of the first distortion-aware object recognition model 274 may be transferred to the second object recognition model 276 to obtain a second distortion-aware object recognition model 278. Such may be the case when the type of prediction task to be performed on UW FOV data by the second object recognition model 276 is different from the prediction task the first object recognition model 272 was trained for.

In one or more embodiments, the compressed distortion-aware object recognition model 280 is obtained by compressing one of the first distortion-aware object recognition model 274 and the second distortion-aware object recognition model 278 for deployment on embedded systems having less computing capabilities than the server 250 for example.

The scene understanding distortion-aware object recognition model 282 may be obtained by integrating the compressed distortion-aware object recognition model 280 with a scene understanding model comprising a graph inference module configured to generate scene graphs containing a set of localized objects, categories of each object, and relationship types between each pair of objects. The scene understanding distortion-aware object recognition model 282 is configured to perform high-priority objects prediction and localization in 360-degrees data acquired by UW FOV sensors.

Database

The database 260 is directly connected to the server 250 but, in one or more alternative implementations, the database 260 may be communicatively coupled to the server 250 via the communications network 245 without departing from the teachings of the present technology. Although the database 260 is illustrated schematically herein as a single entity, it will be appreciated that the database 260 may be configured in a distributed manner, for example, the database 260 may have different components, each component being configured for a particular kind of retrieval therefrom or storage therein.

The database 260 may be a structured collection of data, irrespective of its particular structure or the computer hardware on which data is stored, implemented or otherwise rendered available for use. The database 260 may reside on the same hardware as a process that stores or makes use of the information stored in the database 260 such as the server 250, or it may reside on separate hardware, such as on one or more other electronic devices (not shown) directly connected to the server 250 and/or connected to the communications network 245. The database 260 may receive data from the server 250 and/or the electronic device 210 for storage thereof and may provide stored data to the server 250 and/or the electronic device 210 for use thereof.

The database 260 is configured to inter alba: (i) store model parameters and hyperparameters of the set of ML models 270; (ii) store a training dataset 262; and (iii) store the UW FOV training dataset 264.

The labelled training dataset 262 or set of labelled training examples 262 comprises a plurality of training examples, where each labelled training example is associated with a respective label. The labelled training dataset 262 is used to train the set of ML models 270 to perform a common prediction task.

It will be appreciated that the nature of the labelled training dataset 262 and the number of training data is not limited and depends on the task at hand. The training dataset 262 may comprise any kind of digital file which may be processed by a machine learning model as described herein to generate predictions. In one or more embodiments, the labelled training dataset 262 includes one of: images, videos, text, and audio files.

As a non-limiting example, for computer vision prediction tasks, the labelled training dataset 262 may include labelled images. Depending on the type of image prediction task, the label may be for example a class for image classification tasks, bounding boxes surrounding objects and their respective object classes for image detection tasks, and segmentation maps (i.e. pixel-wise classes) for semantic segmentation. Non-limiting examples of image datasets include ImageNet, BDD100K, Pascal VOC, CIFAR, Fahsion, and Microsoft COCO.

Non-limiting examples of semantic segmentation datasets for urban driving scenes include: KITTI, Cityscapes, Mapillary Vistas, ApolloScape, and BDD100K.

In one or more embodiments, the database 260 stores an UW FOV training dataset 264. In one or more embodiments, the UW FOV training dataset 264 may comprise data acquired by UW FOV sensors such as the first set of sensors 232 which may labelled or annotated for a given type of prediction task. In one or more other embodiments, the UW FOV training dataset 264 may comprise labelled data generated by the server 250, for example based on the labelled training dataset 262, as will be explained in more detail herein below.

In one or more embodiments, the database 260 may store ML file formats, such as .tfrecords, .csv, .npy, and .petastorm as well as the file formats used to store models, such as .pb and .pkl. The database 260 may also store well-known file formats such as, but not limited to image file formats (e.g., .png, .jpeg), video file formats (e.g., .mp4, .mkv, etc), archive file formats (e.g., .zip, .gz, .tar, .bzip2), document file formats (e.g., .docx, .pdf, .txt) or web file formats (e.g., .html).

Ultrawide Field-of-View Scene Understanding Pipeline

Figure 3:
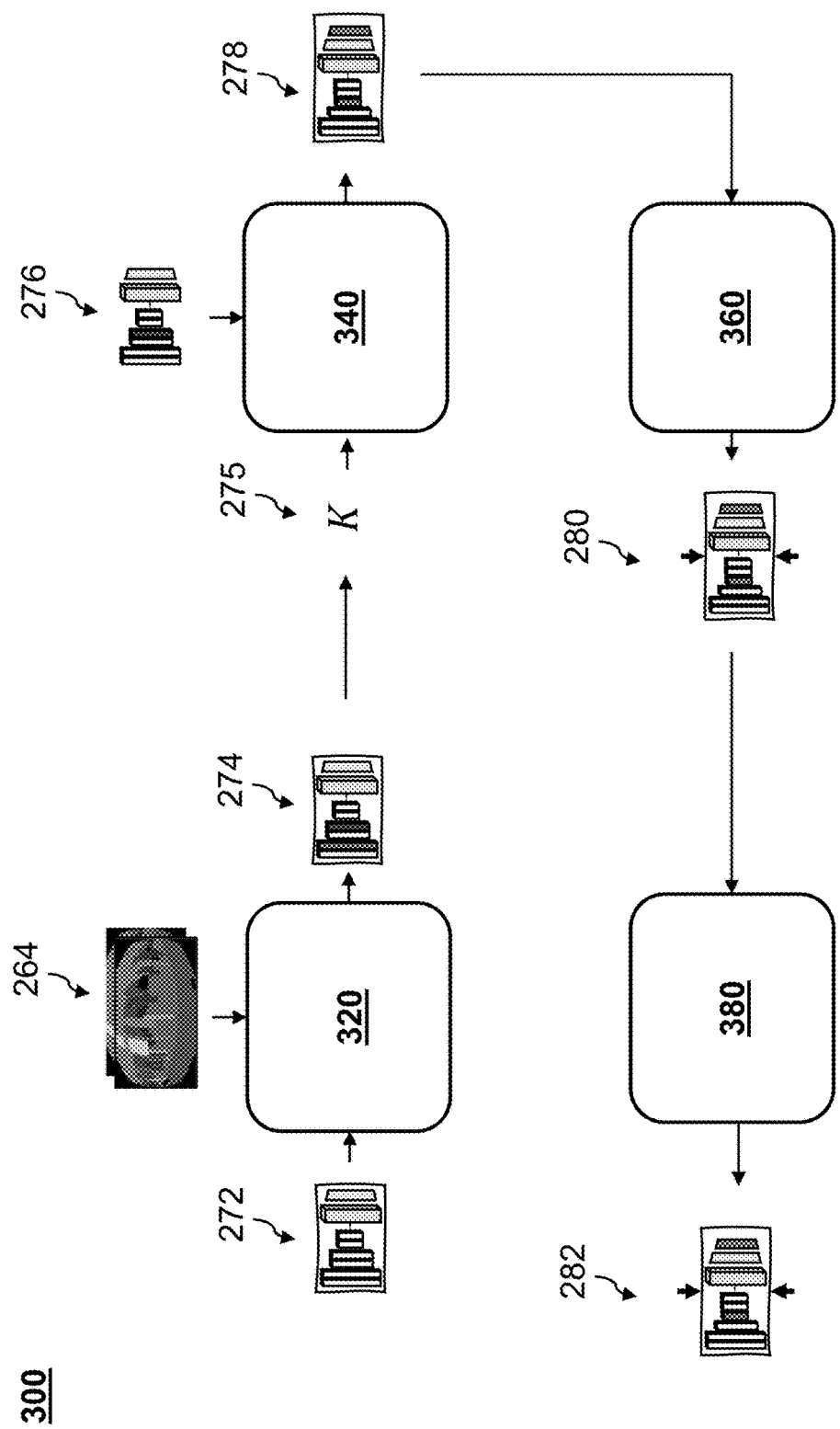
FIG. 3 depicts a schematic diagram of an ultrawide field-of-view scene understanding pipeline in accordance with one or more non-limiting embodiments of the present technology.

With reference to FIG. 3, there is shown a schematic diagram of a ultrawide field-of-view scene understanding pipeline 300 in accordance with one or more non-limiting embodiments of the present technology.

The ultrawide field-of-view scene understanding pipeline 300 is configured to inter alia: (i) adapt an object recognition model to learn distorded features proper to ultrawide field-of-view sensor data to perform object recognition without requiring preprocessing, rectification and correction techniques; (ii) transfer, if necessary, learned model parameters to another object recognition model configured for another type of object recognition task; (iii) compress the another object recognition model for deployment on embedded systems; and (iv) deploy the compressed object recognition model to provide a 360-degree visual scene understanding from UW FOV sensor data captured onboard a vehicle.

The ultrawide field-of-view (UW FOV) scene understanding pipeline 300 is divided into a first stage 320, a second stage 340, a third stage 360 and a fourth stage 380.

It will be appreciated that each of the first stage 320, the second stage 340, the third stage 360, and the fourth stage 380 may be executed by a different electronic device such as the server 250 and/or the electronic device 210. The UW FOV scene understanding pipeline 300 will be described in the context of computer vision applications onboard vehicles having UW FOV Sensors such as the vehicle 220, but it is within the scope of the present technology to use at least a portion of the UW FOV scene understanding pipeline 300 onboard other types of vehicles such as unmanned aerial vehicles (UAVs), drones, satellites and the like.

First Stage: UW FOV Representation Learning

The purpose of the first stage 320 is to train and adapt a first object recognition model 272 to learn features specific to UW FOV data to thereby obtain a first distortion-aware object recognition model 274. Once trained, the first distortion-aware object recognition model 274 may extract features from data acquired by a UW FOV sensor and perform object recognitions tasks.

In the context of computer vision, the object recognition includes one of object detection (bounding boxes and object class prediction) and semantic segmentation (pixel-wise class prediction).

During the first stage 320, the server 250 obtains the first object recognition model 272 and an UW FOV training dataset 264 to simultaneously perform an unsupervised training phase for learning deformable kernel shapes and a supervised training phase for learning to perform object recognition by using inter alia UW FOV features extracted by the deformable kernels in the UW FOV training dataset 264.

Ultra wide Field-of-View Training Dataset

In one or more embodiments, during the first stage 320, the server 250 obtains, from the database 260, a UW FOV training dataset 264 comprising a plurality of UW FOV images. Each UW FOV image is associated with an object recognition label. It will be appreciated that the object recognition label depends on the type of prediction task performed by the first object recognition model 272, e.g. object detection or instance segmentation for computer vision tasks. For segmentation tasks, each label may include a segmentation map, where each pixel belonging to an object in the image is associated with the object class. For objection detection tasks, each label may include bounding boxes surrounding objects and the respective object classes.

In one or more embodiments, the server 250 generates the UW FOV training dataset 264 by using a distortion model on rectilinear images. It will be appreciated that the UW FOV training dataset 264 may be generated in instances when there is insufficient ultrawide FOV training data to train the first object recognition model 272.

The server 250 may generate or synthesize the plurality of UW FOV images either by simulating a fisheye-like distortion on rectilinear images or by rendering images from a 3D scene using virtual fisheye cameras.

In one or more embodiments, to simulate fisheye distortion on rectilinear images, a distortion model of the open-source library OpenCV2 may be used. Noting (x, y) a couple of normalized coordinates in the rectilinear image, the distortion functions maps them to normalized fisheye coordinates (x', y') by using the following set of equations:

$$r^2 = x^2 + y^2$$

$$\theta = \arctan(r)$$

$$\theta_3 = \theta \cdot (1 + k_1\theta^2 + k_2\theta^4 + k_3\theta^6 + k_4\theta^9)$$

$$x' = f \cdot (\theta_d/r) \cdot x + x'_0$$

$$y' = f \cdot (\theta_d/r) \cdot y + y'_0 \qquad (1)$$

The parameters $\{f, k_i\}_{i=1}^{4}$ are tunable and $(x'_0, y'_0)$ can be adjusted to change the distortion center. Values of f, which corresponds to a scale actor (as an approximation of a varying focal length), may be limited. Using this set of equations, distortion on real images from a dataset such as the Cityscape dataset may be applied.

Figure 7A:
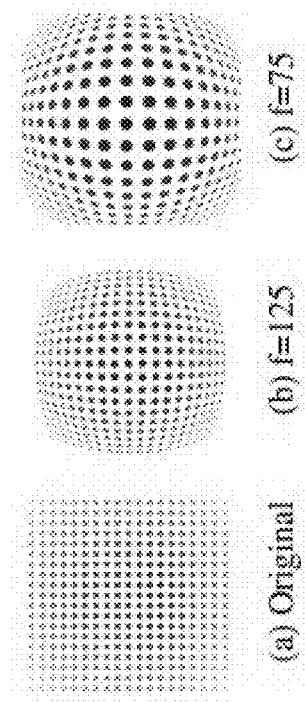
FIG. 7A depicts examples of distortion generated by using a parametric polynomial to synthesize fish-eye like images in accordance with one or more non-limiting embodiments of the present technology.

With brief reference to FIG. 7A, there are depicted examples of distortion generated by using a parametric polynomial to synthesize fish-eye like images.

Figure 7B:
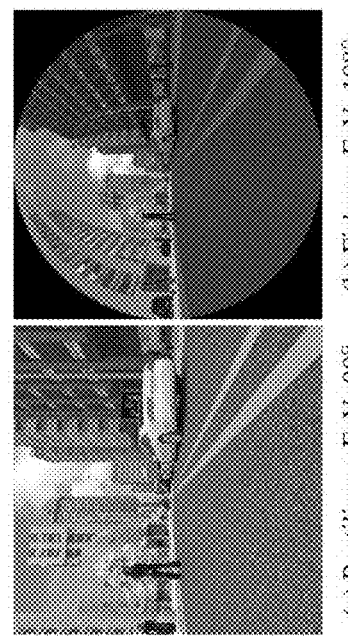
FIG. 7B depicts 3D renders of a scene by using the same spatial camera with a rectilinear 80 degree lens and fisheye 180 degree lens in accordance with one or more non-limiting embodiments of the present technology.

With brief reference to FIG. 7B, there are depicted 3D renders of a scene using the same spatial camera with a rectilinear 80 degree lens and fisheye 180 degree lens.

Figure 8A:
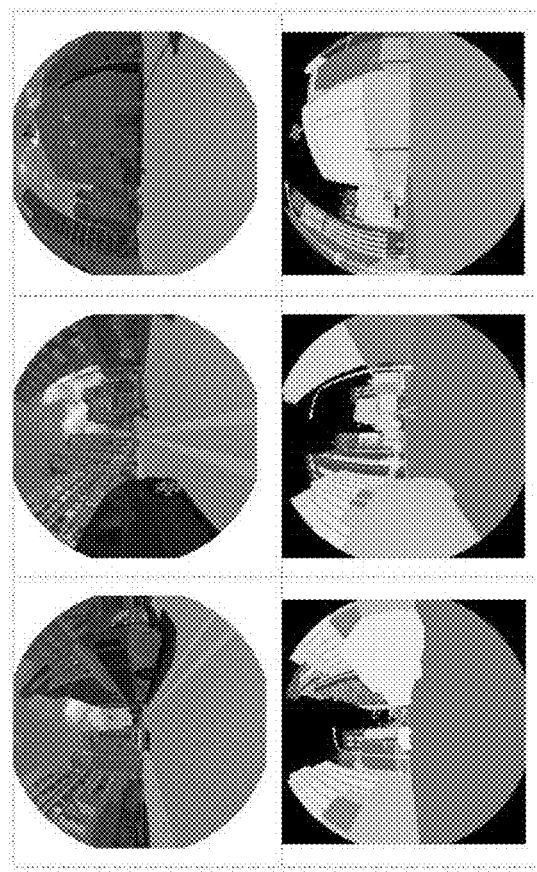
FIG. 8A depicts examples of simulations of fisheye images having been generated using a graphical software and their annotations maps which may be used to train an object recognition model in accordance with one or more non-limiting embodiments of the present technology.

FIG. 8A depicts examples of simulations of fisheye images having been generated by using a graphical software and their annotations maps which may be used as part of the UW FOV training dataset 264.

Figure 8B:
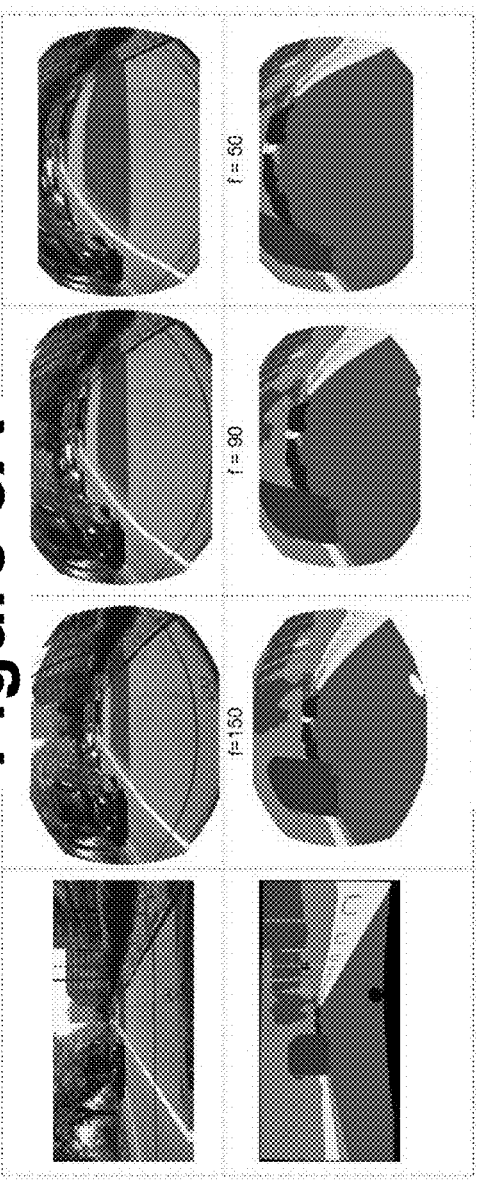
FIG. 8B depicts examples of simulation of fisheye images from mapping perspective images to fisheye distortion space using a polynomial model and equidistance projection which may be used to train an object recognition model in accordance with one or more non-limiting embodiments of the present technology.

FIG. 8B depicts examples of simulation of fisheye images from mapping perspective images to fisheye distortion space using a polynomial model and equidistance projection which may be used as part of the UW FOV training dataset 264.

Object Recognition Model

Turning back to FIG. 3, during the first stage 320, the server 250 obtains a first object recognition model 272. The first object recognition model 272 is a CNN-based deep neural network machine learning model. In one or more embodiments, the first object recognition model 272 is an image recognition model and has an encoder-decoder architecture.

In one or more embodiments, the server 250 obtains the first object recognition model 272 from the database 260 and/or from another electronic device over the communication network 245. As a non-limiting example, the first object recognition model 272 may be a pretrained machine learning model based on one or more of AlexNet, Inception, VGG, ResNet, and DeepLabV3+.

In one or more alternative embodiments, the server 250 obtains the first object recognition model 272 by initializing model parameters and hyperparameters thereof according to a chosen architecture and by performing a supervised training phase on a training dataset such as the labelled training dataset 262.

As a non-limiting example, the first object recognition model 272 may be implemented as DeepLabV3+ and comprise an encoder-network network that reduces the spatial resolution of the input while increasing its depth. The encoder is used to extract features from the input image. The lowest-level features are fed to the second component, the Atrous Spatial Pyramid Pooling (ASPP). The ASPP includes several parallel convolution layers using different dilations rates, working overall as a multi-scale convolutional layer. The last component of the architecture is a decoder module that expands the features from the encoder and the ASPP back up to the input dimensions. The decoder concatenates low-level and mid-level features from the encoder and outputs a segmentation map, i.e. pixel-wise class predictions.

During the first stage 320, the server 250 initializes the first object recognition model 272 such that the first object recognition model 272 comprises a set of Euclidian (regular) convolution layers each associated with a respective set of kernels and at least one non-Euclidian or deformable convolution layer associated with a set of deformable kernels. The respective set of kernels and the respective set of deformable kernels each comprise at least one kernel.

The at least one deformable convolution layer is a convolution layer associated with an offset and a specific kernel shape or deformable kernel that will be learned during training of the first object recognition model 272 on the UW FOV training dataset 264. A deformable convolution adds 2D offsets to the regular grid sampling locations in a standard convolution and enables free form deformation of the sampling grid. During training, the first object recognition model 272 learns the shape of deformable kernels in manifold space at every point of the image spatial support and utilizes them in conventional convolution layers. Thus, training weights are obtained at positions sampled from the deformable kernels and used to perform a convolution on the input feature map.

During the first stage 320, the first object recognition model 272 learns kernel's positions by using the non-Euclidian convolution layers and learns features using the Euclidian convolution layers, thus improving performance over using deformable kernels in all layers.

Figure 4:
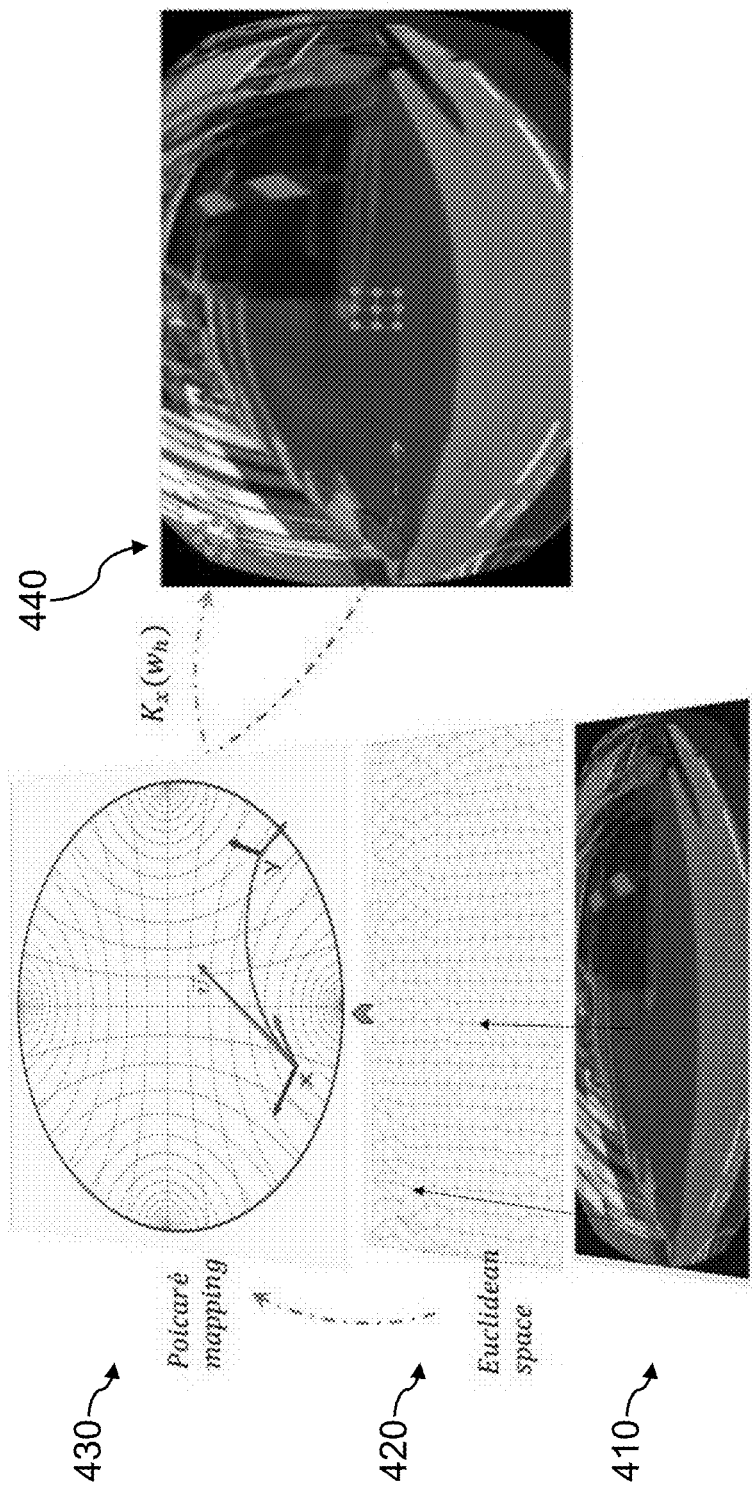
FIG. 4 depicts a schematic diagram of deformable kernels being learned in hyperbolic space in accordance with one or more non-limiting embodiments of the present technology.
Figure 5:
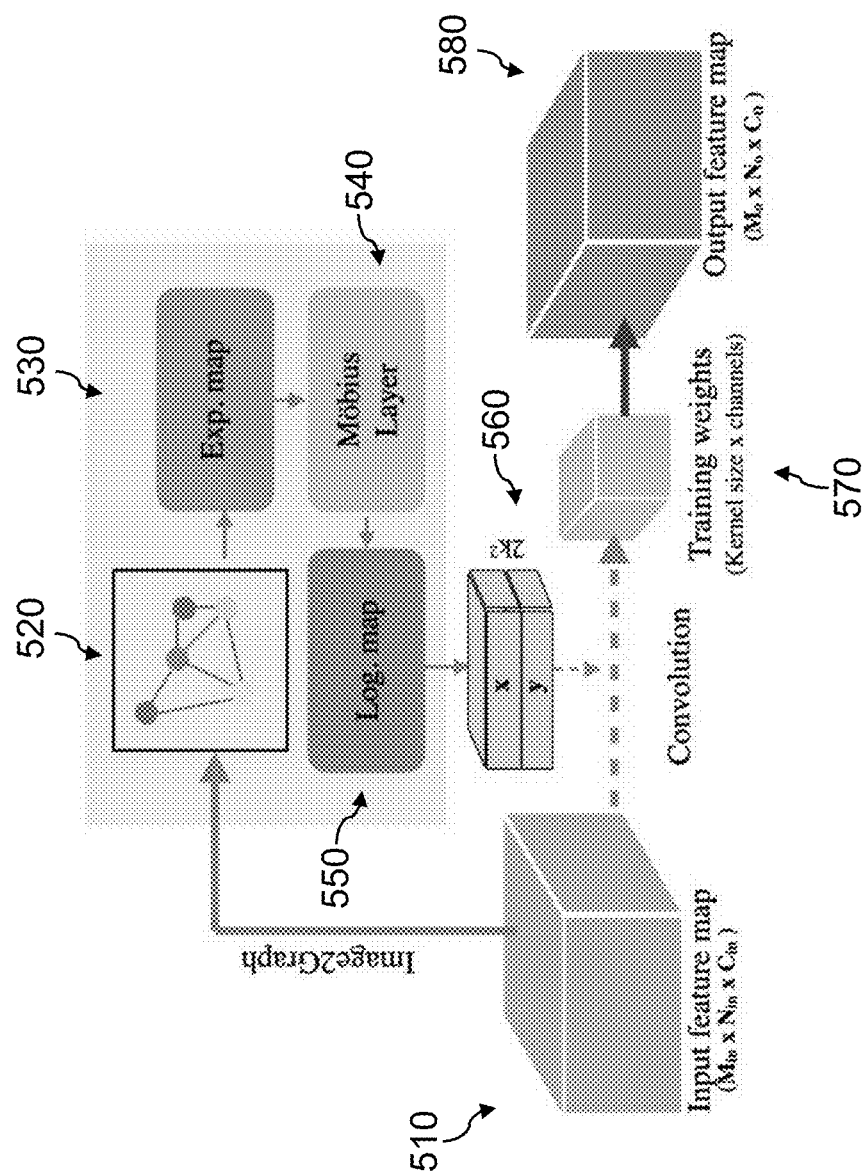
FIG. 5 depicts a schematic diagram of a hyperbolic convolution layer in accordance with one or more non-limiting embodiments of the present technology.

With continuing reference to FIG. 3 to FIG. 5, learning of deformable kernels in hyperbolic space will now be described in accordance with one or more non-limiting embodiments of the present technology.

During the first stage 320, at least one of the layers of the first object recognition model 272 extracts a set of features from a given UW FOV image, the set of features being indicative of at least spatial relations in the given UW FOV image. It will be appreciated that the set of features may be in the form of a feature vector.

In one or more embodiments, the set of features are in the form of a graph representation.

FIG. 4 illustrates how deformable kernels are learned in non-Euclidian or manifold space (e.g. hyperbolic space) during the first stage 320, where images and input feature maps 410 are represented as a graph 420 and mapped to the Poincaré disk 430 for learning positions in a (k×k) receptive field 440 $K_x$ at every spatial location x.

Turning to FIG. 5, during the first stage 320, the server 250 generates graph representations 520 (only one illustrated in FIG. 5) from input images or input feature maps 510 (only one illustrated in FIG. 5). It will be appreciated that the graph representation may be provided as an input to the first object recognition model 272 or may be generated after processing by at least one layer of the first object recognition model 272.

Graph Representation

In one or more embodiments, to leverage spatial information with feature vectors in hyperbolic space, the input feature map 510 is represented as a graph 520. It will be appreciated that images can naturally be modeled as graphs which may be defined on regular grid, where vertices correspond to pixels encoding features information and edges represent their spatial relations. This representation, however, requires considerable computations and memory for large grids. In one or more embodiments, to alleviate such complexity and reduce inputs dimensionality, the resolution of spatial grids may be downsampled by a factor of 2 m (m=2 as default). The downsampling enables faster computations with insignificant effect on the performance, and enables generating the graph from input features online.

In one or more embodiments, CUDA implementations and the open source library Pytorch-geometric may be used to generate graphs 520 from grid feature maps 510. Thus, the input to the non-Euclidian convolution layers is a graph in the form of a vertices matrix $V \in \mathbb{R}^{N \times d}$, where N is the number of vertices and d is the feature dimension, and an adjacency matrix $A^{N \times N}$ encoding spatial information.

In one or more other embodiments, the graph representation is generated from intermediate feature activation layers of the UW FOV image.

Manifold Space

During the first stage 320, the server 250 projects the set of features into a manifold space to obtain a set of projected features. In one or more embodiments, the set of features comprise the graph representation and the manifold space is a hyperbolic space.

During the first stage 320, the convolution kernels of the first object recognition model 272 are lifted from the Euclidian space to a Manifold model defined by a set of equivariant transformations. The set of equivariant transformations include rotation, scale and translation.

A d-dimensional hyperbolic space, denoted $\mathbb{H}^d$, is a homogenous, simply connected, n-dimensional Riemannian manifold with a constant negative curvature c. Analogous to sphere space (which has constant positive curvature), hyperbolic space is a space equipped with non-Euclidean (hyperbolic) geometry in which distances are defined by geodesics (i.e. shortest path between two points). Hyperbolic space has five isometric models: the Klein model, the hyperboloid model, the Poincaré half space model and the Poincaré ball model [3]. A mapping between any two of these models preserves all the geometric properties of the space.

In one or more embodiments, the Poincaré ball model is used during the first stage 320. It will be appreciated that the other models are also valid under isometry. The Poincaré ball model is defined by the Riemannian manifold ($\mathbb{D}_c^d$, $g_x^{\mathbb{D}}$) where $\mathbb{D}_c^d := \{x \in \mathbb{R}^d \mid \|x\| < 1/\sqrt{c}\}$ is an open ball of radius $1/\sqrt{c}$ and its Riemannian metric is given by $g_x^{\mathbb{D}} = (\lambda_x^c)^2 g^E$ such that $$\lambda_x^c := \frac{2}{1 - c\|x\|^2}$$

and $g^E = I_d$ denotes the Euclidean metric tensor (the dot product). The induced distance between two points x, y $\in \mathbb{D}_c^d$ is given by equation (2):

$$d_{\mathbb{D}^c}(x, y) = \frac{1}{\sqrt{c}} \cosh^{-1}\left(1 + 2\frac{\|x - y\|^2}{(1 - c\|x\|^2)(1 - c\|y\|^2)}\right) \quad (2)$$

In hyperbolic space, the natural mathematical operations between vectors, such as vectors addition, subtraction and scalar multiplication are described with Mobius operations [21]. The Mobius addition of x and y in $\mathbb{D}_c^d$ is defined by using equation (3):

$$x \oplus_c y := \frac{(1 + 2c\langle x, y\rangle + c\|y\|^2)x + (1 - c\|x\|^2)y}{1 + 2c\langle x, y\rangle + c^2\|x\|^2\|y\|^2} \quad (3)$$

and the Mobius scalar multiplication of $x \in \mathbb{D}_c^d \setminus \{0\}$, $c<0$, by $a \in \mathbb{R}$ is defined by using equation (4):

$$a \otimes_c x := \frac{1}{\sqrt{c}} \tanh(a \tanh^{-1} \sqrt{c} \|x\|) \frac{x}{\|x\|} \quad (4)$$

It should be noted that subtraction can be obtained by $x \oplus_c (-1 \otimes_c y) = x \otimes_c -y$. When c goes to zero, the natural Euclidean operations may be recovered. The bijective mapping between the Riemannian manifold of the Poincaré ball ($\mathbb{D}_c^d$) and its tangent space (Euclidean vectors $\mathcal{T}_x \mathbb{D}_c^d \cong \mathbb{R}^d$) at a given point is defined by the exponential and logarithmic maps. To do so, Ganea et al. [9] derived a closed-form of the exponential map $\exp_x^c: \mathcal{T}_x \mathbb{D}_c^d \to \mathbb{D}_c^d$ and its inverse $\log_x^c: \mathbb{D}_c^d \to \mathcal{T}_x \mathbb{D}_c^d$ for $v \neq 0$ and $y \neq x$ expressed by equations (5) and (6):

$$\exp_x^c(v) = x \oplus_c \left( \tanh\left( \sqrt{c} \frac{\lambda_x^c \|v\|}{2} \right) \frac{v}{\sqrt{c} \|v\|} \right) \quad (5)$$

$$\log_x^c(y) = \frac{2}{\sqrt{c} \lambda_x^c} \tanh^{-1}(\sqrt{c} \|-x \oplus_c y\|) \frac{-x \oplus_c y}{\|-x \oplus_c y\|} \quad (6)$$

As reported by [9], the maps have nicer forms when $x=0$. This makes the mapping between Euclidean and hyperbolic spaces obtained by $\exp_0^c$ and $\log_0^c$ more useful in practical point of view.

Hyperbolic Convolution Layer

The first object recognition model 272 uses the set of projected features in manifold space (e.g. hyperbolic space) to obtain a set of geometric features which will be used to obtain deformable kernels shapes and distorted features indicative of UW FOV properties in Euclidian space.

The first object recognition model 272 comprises one hyperbolic convolution layer. Euclidean feature vectors are projected on hyperbolic space using an Exponential map 430 according to equation (7):

$$H_v = \exp_0^c(F_v), \quad (7)$$

where Fv is the Euclidean feature vector, and $H_v$ is its projection on hyperbolic space for a give vertex v.

A Mobius layer 440 performs linear transformations on feature vectors inside Poincaré Ball (Eqs. (2) and (3)). Mobius features are mapped to the Euclidean space using the logarithmic map 450, and the spatial information encoded by the adjacency matrix are aggregated with projected features on the tangent (Euclidean) space using an aggregation layer such as the aggregation layer expressed by using equation (8):

$$K = \log_0^c((W_h \otimes_c H) \oplus_c b_h) \odot A, \quad (8)$$

Where $\Theta$ denotes element-wise product, $W_h$ and $b_h$ are hyperbolic weights and bias vectors, K is a dense map of deformable kernels 460 representing the positions inside (k×k) window at every point of the grid.

A conventional or Euclidian convolution is applied between training weights 560 sampled at predicted positions and the input feature map 510 to obtain an output feature map 580 as follows:

Euclidian Convolution Layer

An Euclidian convolution layer is a conventional CNN layer performing convolution between training weights 560 and the input features map 510. Traditional training weights 560 are obtained at the positions sampled from the predicted deformable kernels. For every position p in the grid, the convolution inside a window R of size k×k can thus be defined by using equation (9):

$$F_o(p) = \sum_{\mathcal{R}} F(p) * K_p(p - p_l) + b \quad (9)$$

where $p_l$ are the predicted positions for $l=\{1, \ldots, k \times k\}$, and $F_0$ are the output features at point p. The predicted positions are real values due to fractional displacements from regular grid points. Therefore, convolution (Equation (9)) is implemented using bilinear interpolation following the implementation in [6].

Figure 6:
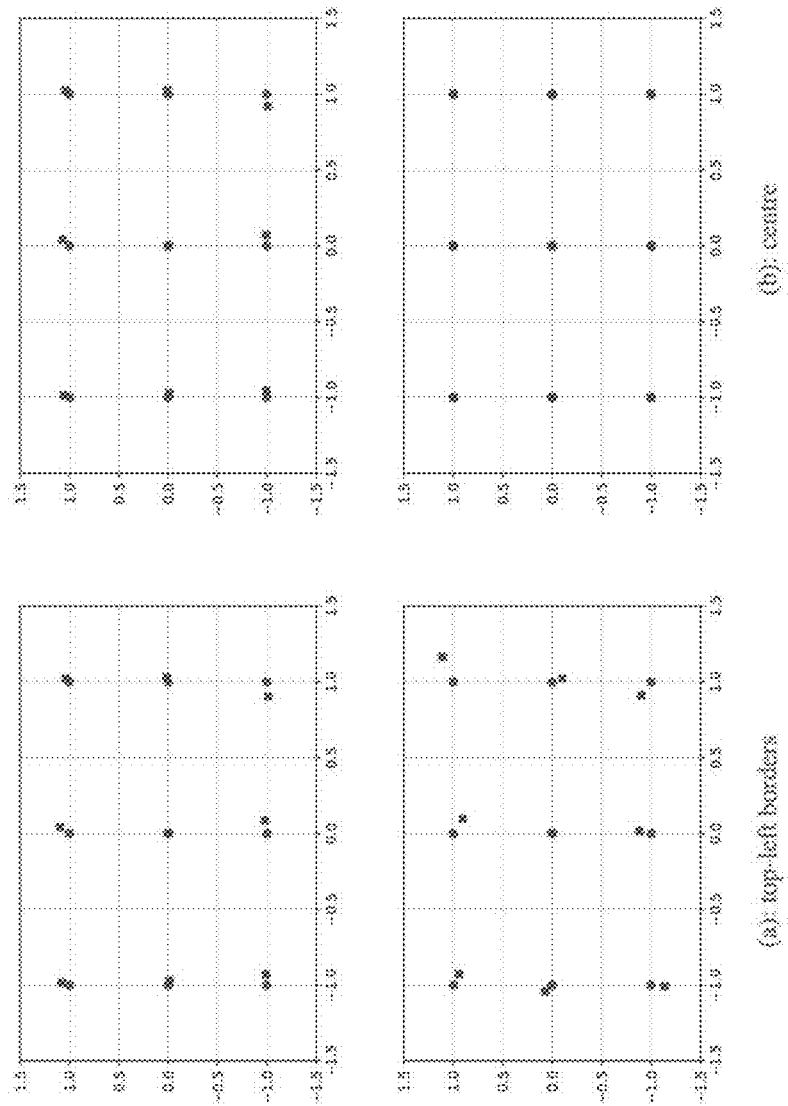
FIG. 6 depicts plots of predicted positions in a (3×3) kernel in Euclidean space (top) and hyperbolic space (bottom) after 20 epochs training on synthetically distorted images in accordance with one or more non-limiting embodiments of the present technology.

With brief reference to FIG. 6, predicted positions in a (3×3) kernel in Euclidean space are shown (top) and hyperbolic space (bottom) after 20 epochs training on synthetically distorted images. Deformable kernels are marked by crosses and regular kernels are marked by dots. Hyperbolic deformable kernels change significantly near the boundaries where fisheye distortion is pronounced (as shown in FIG. 1) and perfectly fit the original grid in the center.

During the first stage 320, the decoder of the first object recognition model 272 learns how to process features generated by the non-Euclidian convolution layers to obtain a prediction. The prediction may be for example an image classification, image detection (bounding box detection and object classification) and semantic segmentation (pixel-wise object classification)

An objective function is used to compare the prediction of the first object recognition model 272 and the label of the given training example in the UW FOV training dataset 264, and at least a portion of the parameters of the first object recognition model 272 are updated using back-propagation.

In one or more embodiments, a pixel-wise weighted cross-entropy loss function may be used. It will be appreciated that depending on the prediction task, other loss functions may be used such as classification and localization loss functions.

Upon reaching or satisfying a termination condition, the server 250 outputs the first trained object recognition model or first distortion-aware object recognition model 274. As a non-limiting example, the termination may be one or more of: a desired accuracy, a computing budget, a maximum training duration, a lack of improvement in performance, a system failure, and the like.

The first distortion-aware object recognition model 274 is adapted to perform object recognition in data acquired by UW FOV sensors.

It will be appreciated that if the prediction task to be performed is the same as the first object recognition model 272 was configured for, the first distortion-aware object recognition model 274 may be provided to perform object recognition.

As a non-limiting example, the first object recognition model 272 may be trained by the server 250 by using 2 GPUs similar to the GPU 111 using synchronized batchnorm. The learning rate may be initialized to $1 \times 10^{-3}$ for the encoder and $1 \times 10^{-2}$ for the decoder and both may be updated using the "poly" learning rate policy. For synthetic fisheye dataset, the training batch size may be set to 16 and the validation batch size may be set to 4. For real fisheye data, the batch size may be set to 8 during training and validation. For the first object recognition model 272 model, the weights of the hyperbolic convolution layers (non- Euclidian convolution layers) are initialized using the Xavier uniform distribution. The encoder and decoder layers of the baseline architecture may be initialized with ImageNet weights.

In one or more embodiments, such as in instances when the prediction task to be performed on data acquired by UW FOV sensor is of a different type than the type of prediction task performed by the distortion-aware object recognition model 274, models parameters of the distortion-aware object recognition model 274 may be transferred to another machine learning model according to the second stage 340.

Second Stage: Transfer Learning

The purpose of the second stage 340 is to perform transfer learning of UW FOV features or learned kernel weights 275 to object recognition tasks such as object detection and instance segmentation.

The second stage 340 aims to transfer the kernel weights 275 of the distortion-aware object recognition model 274 to a second object recognition model 276 configured to perform a different prediction task. As a non-limiting example, in computer vision applications, the first object recognition model 272 may have been trained to perform semantic segmentation and its weights may be transferred to a second object recognition model 276 implemented to perform object detection prediction tasks.

The server 250 obtains a UW FOV training dataset (not depicted) for the prediction task to be performed by the second object recognition model 276.

The server 250 obtains the second object recognition model 276. As a non-limiting example, for semantic segmentation tasks, the second object recognition model 276 may be implemented based on the Mask-RCNN architecture. As another non-limiting example, for object detection tasks, the second object recognition model 276 may be implemented based on the You Look Only Once (YOLO) architecture.

In one or more embodiments, the server 250 obtains the second object recognition model 276 by initializing model parameters and hyperparameters of a chosen architecture and performing supervised training on a training dataset such as ImageNet, CIFAR, COCO, Pascal, CityScape, and the like.

The server 250 obtains the kernel weights 275 of the distortion-aware object recognition model 274. In one or more embodiments, the kernel weights 275 may be stored in the database 260 together with other parameters of the trained object recognition model 274. In one or more other embodiments, the kernel weights 275 may be obtained over the communication network 245, for example when the first stage 320 and the second stage 340 are executed by different electronic devices such as the electronic device 210.

The server 250 performs bilinear interpolation to fit the parameters of the second object recognition model 276 to the kernel weights of the trained object recognition model 274 to obtain a fitted object recognition model (not numbered).

The server 250 then fine-tunes the fitted object recognition model (not numbered) by optimizing the task-specific objective function using a UW FOV training dataset to thereby obtain a second distortion-aware object recognition model 278.

The server 250 outputs the second trained or distortion-aware object recognition model 278.

Third Stage: Compression

In one or more embodiments, the server 250 performs the third stage 360. The purpose of the third stage 360 is to compress the second distortion-aware object recognition model 278 based on pruning and quantization techniques to obtain the compressed distortion-aware object recognition model 280 configured for deployment on embedded systems, for example on a computing device onboard a vehicle having UW FOV sensors (e.g. the vehicle 220, a satellite, a drone, and the like).

In one or more other embodiments, the first distortion-aware object recogntion model 274 may be compressed to obtain the compressed object recognition model 280. In one or more alternative embodiments, the third stage 360 may be optional.

During the third stage 360, the server 250 uses a compression algorithm that aims at learning how to reduce the size of the second distortion-aware object recognition model 278 for deployment on embedded systems such as the electronic device 210 on board the vehicle 220.

In one or more embodiments, given the output (features) of each layer of the second distortion-aware object recognition model 278, the server 250 applies a pointwise quantization function that reduces the precision of weights from 32-bit to n-bits (n<32, in the binary case n=2). The quantized network is fine-tuned by estimating the gradients with respect to the real weights in order to maintain the accuracy of the second distortion-aware object recognition model 278

The server 250 applies a pruning function on quantized weights to remove non-informative and redundant information. The server 250 uses Bayesian optimization to predict the pruning ratio or pruning threshold. The Bayesian rule is used to choose the quantized filters if the distance between real-values and quantized weights is smaller than a threshold and throw out the quantized filters out the rejection boundaries.

The server 250 then obtains compressed model parameters of the compressed distortion-aware object recognition model 280.

The server 250 outputs the compressed distortion-aware object recognition model 280, the compressed object recognition model 280 being configured to perform real-time object recognition on embedded systems in data acquired by UW FOV sensors.

Fourth Stage: UW FOV Scene Understanding

The purpose of the fourth stage 380 is to deploy the compressed object recognition model 280 for inference on an embedded system such as the electronic device 210 of the vehicle 220 using multiple UW FOV cameras, and apply a scene graph model to capture visual relationships between objects where the goal is to predict high priority objects in the surrounding area 240 of the vehicle 220.

In one or more embodiments, the electronic device 210 performs the fourth stage 380. It will be appreciated that any embedded system having required computing capabilities may perform the fourth stage 380.

The electronic device 210 associated with the vehicle 220 obtains the compressed distortion-aware object recognition model 280. In one or more embodiments, the electronic device 210 obtains a graph inference module, which may be for example part of a scene understanding model (not depicted). The graph inference module The electronic device 210 integrates the compressed distortion-aware object recognition model 280 with the graph inference module to the obtain scene understanding distortion-aware object recognition model 282.

In one or more embodiments, the electronic device 210 may obtain the scene understanding distortion-aware object recognition model 282 comprising the compressed distortion-aware object recognition model 280 and the graph inference module. The graph inference module uses a recurrent neural network (RNN) network to maximize the probability of an object x (node 1) of class c and bounding box offset's r is connected (edge) to another object y (node 2).

During the fourth stage, UW FOV images of the surrounding area 240 acquired by the first set of sensors 232 are received by the electronic device 210. As a non-limiting example, the UW FOV images together may cover 360 degree of the surrounding area 240 of the vehicle 220.

The electronic device 210 uses the compressed distortion-aware object recognition model 280 to perform object recognition in the UW FOV imaged acquired by the first set of sensors 232. In one or more embodiments, the compressed distortion-aware object recognition model 280 detects, in each of the UW FOV images, a set of objects, where each object is associated with a bounding box surrounding the object indicative of its location in the UW FOV image and an object class.

The electronic device 210 uses the graph inference module to obtain, for the UW FOV images, a scene graph of the detected objects including object classes, bounding boxes, and semantic relationships between pairs of objects. The scene graph may then used to infer priority levels of detected objects in the surrounding area 240 to perform decisions by using other machine learning models. As a non-limiting example, the electronic device 210 may a control command to the vehicle 220, which may cause the vehicle 220 to perform a maneuver.

Figure 9:
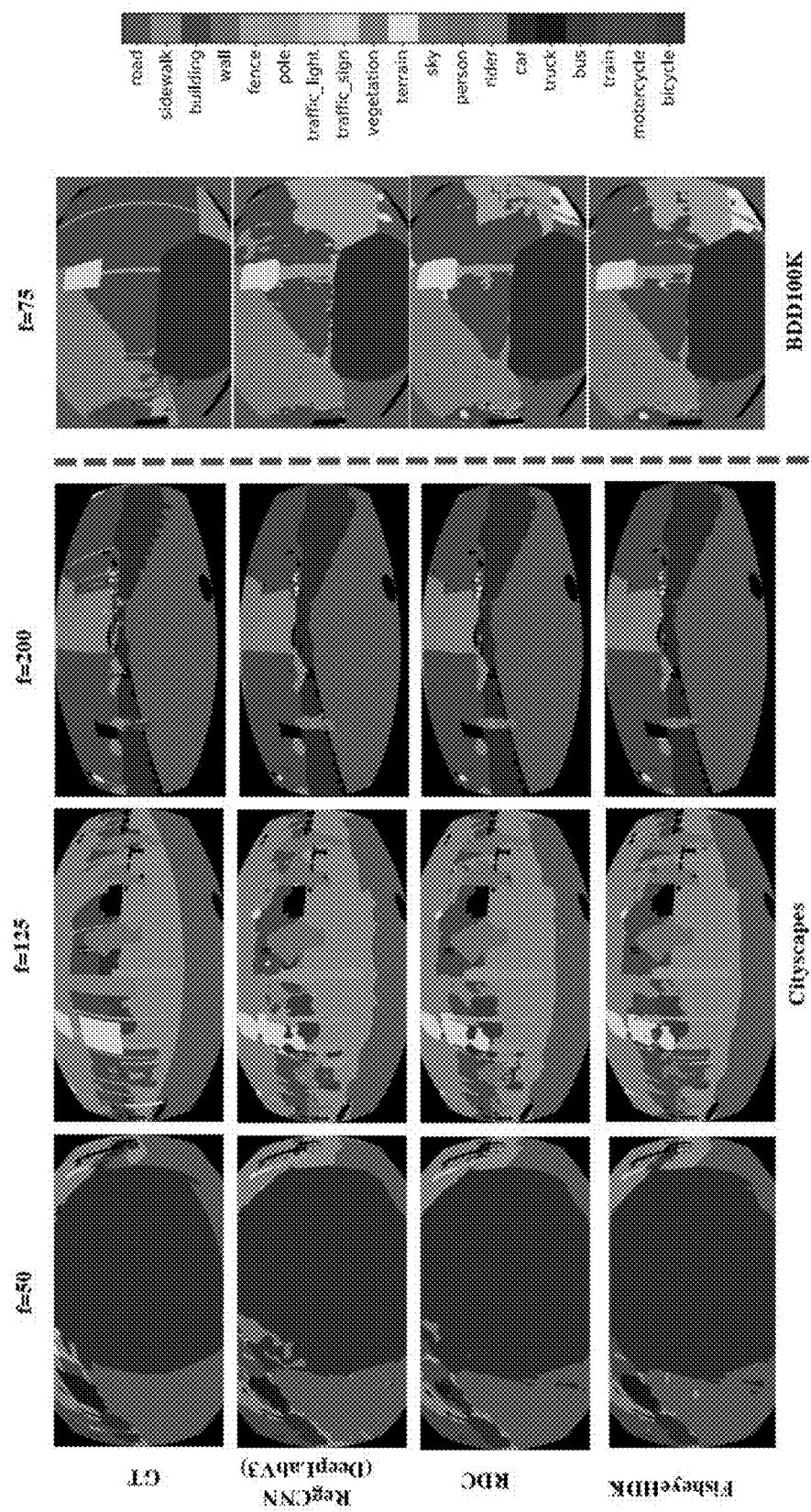
FIG. 9 depicts qualitative results of different segmentation techniques on the CityScape and the BDD100K image dataset in accordance with one or more non-limiting embodiments of the present technology.

FIG. 9 depicts qualitative results of different segmentation models: GT, a regular convolutional neural network (CNN), Restricted deformable convolution (RDC), and the present approach labelled as FisheyeHDK on the CityScape at f=50,125,200 and and the BDD100K image dataset (f=75). Regular CNN is the worst performing model on distorted images. The present approach improves regular CNN better than RDC approach on both datasets.

Method Description

Figure 10:
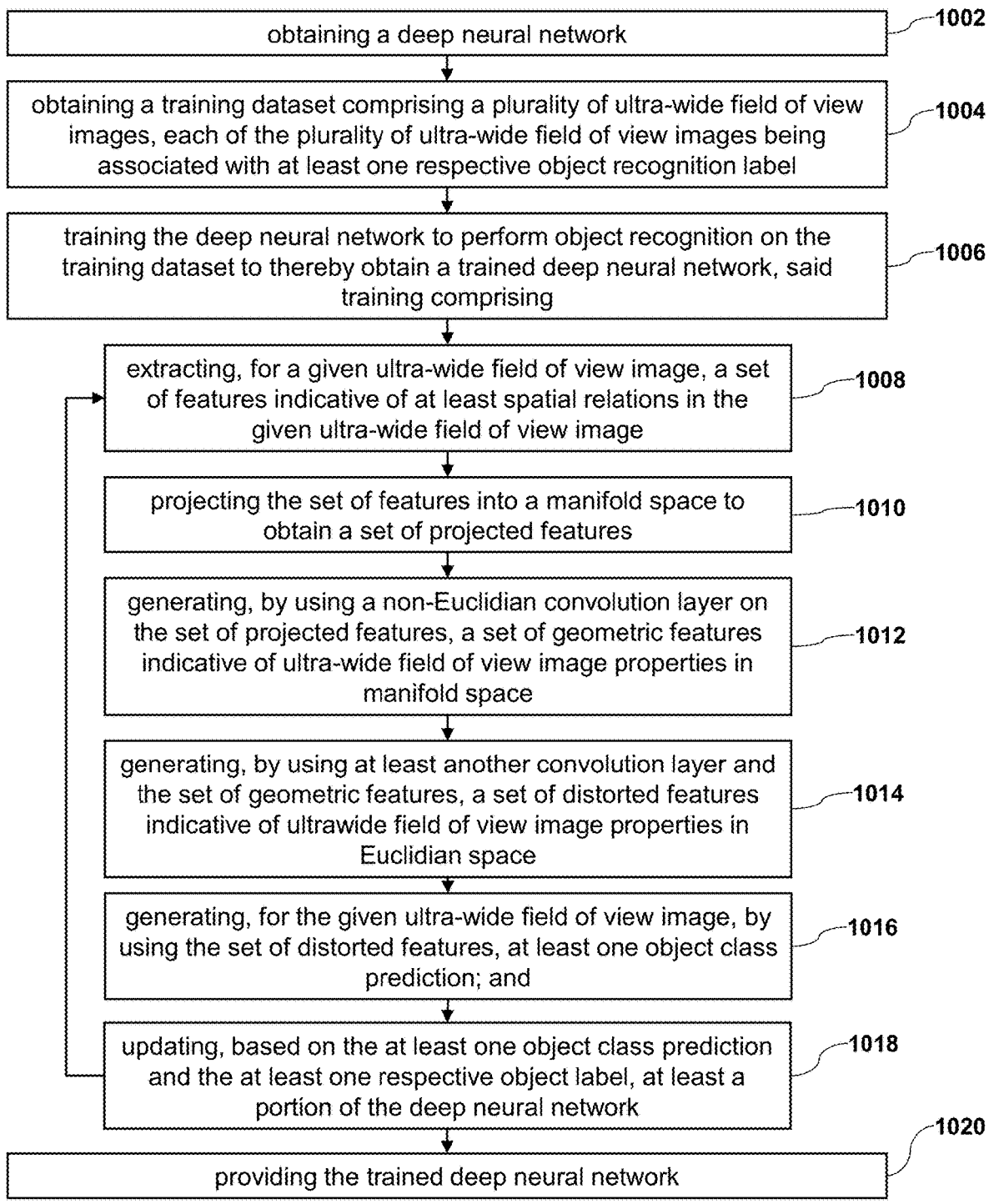
FIG. 10 depicts a flow chart of a method of providing a trained deep neural network adapted to perform object recognition in data acquired by ultrawide field of view sensors in accordance with one or more non-limiting embodiments of the present technology.

FIG. 10 depicts a flowchart of a method 1000 of training a deep neural network to obtain a distortion-aware object recognition model in accordance with one or more non-limiting embodiments of the present technology.

In one or more embodiments, the server 250 executes the method 1000.

In one or more embodiments, the server 250 comprises a processing device such as the processor 110 and/or the GPU 111 operatively connected to a non-transitory computer readable storage medium such as the solid-state drive 120 and/or the random-access memory 130 storing computer-readable instructions. The processing device, upon executing the computer-readable instructions, is configured to or operable to execute the method 1000.

The method 1000 begins at processing step 1002.

According to processing step 1002, the processing device obtains a deep neural network, the deep neural network comprising a set of convolution layers each associated with respective kernels, the set of convolution layers comprising a deformable convolution layer associated with a deformable kernel.

In one or more embodiments, the deep neural network comprises the first object recognition model 272 which comprises a set of convolution layers comprising at least one deformable convolution layer. The first object recognition model 272 may be a pretrained model having been trained to perform object recognition tasks comprising one of object detection and semantic segmentation.

According to processing step 1004, the processing device obtains a training dataset in the form of the ultrawide field-of-view (UW FOV) training dataset 264 comprising a plurality of ultrawide field-of-view (UW FOV) images, each of the plurality of ultrawide field of view images being associated with at least one respective object recognition label.

In one or more embodiments, the processing device obtains a training dataset 262 comprising rectilinear images and generates the UW FOV training dataset 264 by simulating UW FOV or fisheye distortion on the rectilinear images of the training dataset 262. It will be appreciated that the UW FOV training dataset 264 may be generated in instances when there is insufficient ultrawide FOV training data to train the first object recognition model 272.

According to processing step 1006, the processing device iteratively trains the deep neural network in the form of the first object recognition model 272 to perform object recognition on the UW FOV training dataset 264 to thereby obtain a distortion-aware object recognition model 274. The iterative training comprises processing steps 1008-1016.

According to processing step 1008, during training, the processing device extracts, using at least one of the set of convolution layers of the first object recognition model 272, for a given UW FOV image in the UW FOV training dataset 264, a set of features indicative of at least spatial relations in the given UW FOV image.

In one or more embodiments, the processing device generates a graph representation from an input feature map of the given UW FOV image. In one or more other embodiments, the processing device generates a graph representation from intermediate feature activation layers of the UW FOV image. The graph representation comprises a vertices matrix and an adjacency matrix.

According to processing step 1010, the processing device projects the set of features into a manifold space to obtain a set of projected features.

In one or more embodiments, the manifold space is a hyperbolic space and the projecting comprises using one of a Klein model, a hyperboloid model, a Poincaré half space model and a Poincaré ball model. In one or more embodiments, the processing device projects the graph representation into hyperbolic space by using an exponential map.

According to processing step 1012, the processing device generates, by using a non-Euclidean convolution layer on the set of projected features in manifold space, a set of geometric features in manifold space.

In one or more embodiments, the non-Euclidian convolution layer is a hyperbolic convolution layer. The set of hyperbolic geometric features provide information about the shape of kernel in hyperbolic space.

The processing device maps the set of hyperbolic geometric features to Euclidian space by using a logarithmic map to obtain a set of geometric features. The set of geometric features are used to obtain the deformable kernels.

In one or more embodiments, the processing device aggregates spatial information encoded by the adjacency matrix with projected features on the tangent (Euclidean) space to obtain a set of UW FOV features indicative of the shape of the deformable kernel in Euclidian space.

According to processing step 1014, the processing device generates, by using at least another convolution layer and the set of geometric features, a set of distorted features indicative of ultrawide field of view image properties in Euclidian space.

The set of geometric features are indicative of the shape of the deformable kernels and are used by the another Euclidian convolution layer to perform a convolution to obtain a set of distorted features or output feature map indicative of ultrawide field of view image properties in Euclidian space.

According to processing step 1016, the processing device generates, for the given ultrawide field of view image, by using the set of distorted features, at least one object class prediction.

The processing devices applies a convolution using the weights sampled at predicted positions and the input feature map to obtain an output feature map or set of distorted features. The set of distorted features are UW FOV features comprising information about objects in a UW FOV scene.

The set of distorted features are further processed by remaining layers of the first object recognition model 272 to generate a recognition prediction.

In one or more embodiments, the set of distorted features are provided to the decoder layers of the first object recognition model 272 which performs an object recognition prediction (e.g. object detection or semantic segmentation).

According to processing step 1018, the processing device updates, based on the at least one object prediction and the at least one respective object label in the UW FOV training dataset 264, at least a portion of the deep neural network comprising the deformable kernel to obtain a learned deformable kernel associated with the deformable convolution layer. The processing device uses an objective function to update at least a portion of the model parameters of the first object recognition model 272.

According to processing step 1020, the processing device provides the trained deep neural network, i.e. the first distortion-aware object recognition model 274.

In one or more embodiments, the processing device provides the first distortion-aware object recognition model 274 upon reaching or satisfying a termination condition. As a non-limiting example, the training may stop upon reaching one or more of: a desired accuracy, a computing budget, a maximum training duration, a lack of improvement in performance, a system failure, and the like.

The method 1000 then ends.

It should be expressly understood that not all technical effects mentioned herein need to be enjoyed in each and every embodiment of the present technology. For example, embodiments of the present technology may be implemented without the user enjoying some of these technical effects, while other non-limiting embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fiber-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting.

Clause 1: A method for providing a trained deep neural network to extract features from images acquired by ultrawide field of view (FOV) sensors, the method being executed by a processor, the method comprising:
   obtaining a deep neural network, the deep neural network comprising a set of convolutional layers each associated with respective kernels, the set of convolution layers comprising at least one convolution layer associated with a deformable kernel;
   obtaining a training dataset comprising a plurality of ultrawide field of view images, each of the plurality of ultrawide field of view images being associated with at least one respective object class label;
   training the deep neural network to perform object recognition on the training dataset to thereby obtain a trained deep neural network, said training comprising:
      extracting, by using at least one of the set of convolution layers, for a given ultrawide field of view image, a set of features indicative of at least spatial relations in the given ultrawide field of view image;
      projecting the set of features into a manifold space to obtain a set of projected features;
      generating, by using a non-Euclidian convolution layer in manifold space on the set of projected features, a set of geometric features indicative of ultrawide field of view image properties in manifold space;
      generating, by using at least another convolution layer of the set of convolution layers and the set of geometric features, a set of distorted features indicative of ultrawide field of view image properties in Euclidian space;
      generating, for the given ultrawide field of view image, by using the set of distorted features, at least one object class prediction; and
      updating, based on the at least one object class prediction and the at least one respective object class label, at least a portion of the deep neural network comprising the deformable kernel to obtain a learned deformable kernel;
   providing the trained deep neural network, the trained deep neural network comprising the set of convolutional layers comprising the at least one convolution layer associated with the learned deformable kernel.

Clause 2: The method of clause 1, wherein object recognition comprises semantic segmentation; wherein the at least one respective object class label comprises a respective segmentation map; and wherein the at least one object class prediction comprises a pixel-wise class prediction.

Clause 3: The method of clause 1 or 2, wherein the manifold space comprises a hyperbolic space.

Clause 4: The method of clause 3, wherein said projecting the set of features into a manifold space to obtain a set of projected features comprises using a Poincaré ball model.

Clause 5: The method of clause 4, further comprising, after said generating, by using the non-Euclidian convolution layer in the manifold space on the set of projected features, the set of geometric features indicative of ultrawide field of view image properties in the manifold space:
   projecting back the set of geometric features into Euclidian space to obtain deformable kernel values; and wherein
   said generating, by using at least another convolution layer of the set of convolution layers and the set of geometric features, the set of distorted features indicative of ultrawide field of view image properties in Euclidian space comprises using the deformable kernel values to generate the set of distorted features.

Clause 6: The method of any one of clauses 1 to 5, further comprising, prior to said extracting, for the given ultrawide field of view image, by using at least one the set of convolution layers, the set of features:
   generating, using the given ultrawide field of view image, a graph representation thereof to be used to extract the set of features therefrom.

Clause 7: The method of any one of clauses 1 to 6, wherein said updating comprises using backpropagation.

Clause 8: The method of any one of clauses 1 to 7, wherein said updating comprises using a reconstruction loss as an objective function.

Clause 9: The method of any one of clauses 1 to 8, wherein the deep neural network has an encoder-decoder architecture.

Clause 10: The method of any one of clauses 1 to 7, wherein the plurality of ultrawide field of view images comprise a field of view between 180 degrees and 360 degrees.

Clause 11: A method of training a further deep neural network to perform image recognition according to clause 10, the method comprising:
  obtaining respective learned kernels and the learned deformable kernel;
  obtaining the further deep neural network;
  fitting the further deep neural network by using the respective learned kernels and the learned deformable kernel to obtain a fitted deep neural network;
  obtaining another plurality of ultrawide field of view images, each of the another plurality of ultrawide field of view images being labelled with an object recognition label; and
  training the fitted deep neural network to perform image recognition on the another plurality of ultrawide field of view images to thereby obtain another trained deep neural network adapted to perform image recognition on ultrawide field of view images.

Clause 12: The method of clause 11, wherein said fitting comprises using bilinear interpolation.

Clause 13: The method of clause 12, wherein image recognition comprises one of object detection and semantic segmentation.

Clause 14: A system for providing a trained deep neural network to extract features from images acquired by ultrawide field of view (FOV) sensors, the system being executed by a processor, the system comprising:
  a processor;
  a non-transitory storage medium operatively connected to the processor, the non-transitory storage medium comprising computer-readable instructions;
  the processor, upon executing the instructions, being configured for:
    obtaining a deep neural network, the deep neural network comprising a set of convolutional layers each associated with respective kernels, the set of convolution layers comprising at least one convolution layer associated with a deformable kernel;
    obtaining a training dataset comprising a plurality of ultrawide field of view images, each of the plurality of ultrawide field of view images being associated with at least one respective object class label;
    training the deep neural network to perform object recognition on the training dataset to thereby obtain a trained deep neural network, said training comprising:
      extracting, by using at least one of the set of convolution layers, for a given ultrawide field of view image, a set of features indicative of at least spatial relations in the given ultrawide field of view image;
      projecting the set of features into a manifold space to obtain a set of projected features;
      generating, by using a non-Euclidian convolution layer in manifold space on the set of projected features, a set of geometric features indicative of ultrawide field of view image properties in manifold space;
      generating, by using at least another convolution layer of the set of convolution layers and the set of geometric features, a set of distorted features indicative of ultrawide field of view image properties in Euclidian space;
      generating, for the given ultrawide field of view image, by using the set of distorted features, at least one object class prediction; and
      updating, based on the at least one object class prediction and the at least one respective object class label, at least a portion of the deep neural network comprising the deformable kernel to obtain a learned deformable kernel; and
    providing the trained deep neural network, the trained deep neural network comprising the set of convolutional layers comprising the at least one convolution layer associated with the learned deformable kernel.

Clause 15: The system of clause 14, wherein object recognition comprises semantic segmentation; wherein the at least one respective object class label comprises a respective segmentation map; and wherein the at least one object class prediction comprises a pixel-wise class prediction.

Clause 16: The system of clause 14 or 15, wherein the manifold space comprises a hyperbolic space.

Clause 17: The system of clause 16, wherein said projecting the set of features into a manifold space to obtain a set of projected features comprises using a Poincaré ball model.

Clause 18: The system of clause 17, wherein the processor is further configured for, after said generating, by using the non-Euclidian convolution layer in the manifold space on the set of projected features, the set of geometric features indicative of ultrawide field of view image properties in the manifold space:
  projecting back the set of geometric features into Euclidian space to obtain deformable kernel values; and
  wherein said generating, by using at least another convolution layer of the set of convolution layers and the set of geometric features, the set of distorted features indicative of ultrawide field of view image properties in Euclidian space comprises using the deformable kernel values to generate the set of distorted features.

Clause 19: The system of any one of clauses 14 to 18, wherein the processor is further configured for, prior to said extracting, for the given ultrawide field of view image, by using at least one the set of convolution layers, the set of features:
  generating, using the given ultrawide field of view image, a graph representation thereof to be used to extract the set of features therefrom.

Clause 20: The system of any one of clauses 14 to 19, wherein said updating comprises using backpropagation.

Clause 21: The system of any one of clauses 14 to 20, wherein said updating comprises using a reconstruction loss as an objective function.

Clause 22: The system of any one of clauses 14 to 21, wherein the deep neural network has an encoder-decoder architecture.

Clause 23: The system of any one of clauses 14 to 22, wherein the plurality of ultrawide field of view images comprise a field of view between 180 degrees and 360 degrees.

Clause 24: A system of training a further deep neural network to perform image recognition according to clause 23, the system comprising:

obtaining respective learned kernels and the learned deformable kernel;

obtaining the further deep neural network;

fitting the further deep neural network by using the respective learned kernels and the learned deformable kernel to obtain a fitted deep neural network;

obtaining another plurality of ultrawide field of view images, each of the another plurality of ultrawide field of view images being labelled with an object recognition label; and training the fitted deep neural network to perform image recognition on the another plurality of ultrawide field of view images to thereby obtain another trained deep neural network adapted to perform image recognition on ultrawide field of view images.

Clause 25: The system of clause 24, wherein said fitting comprises using bilinear interpolation.

Clause 26: The system of clause 25, wherein image recognition comprises one of object detection and semantic segmentation.

REFERENCES

[1] S. Bonnabel. Stochastic gradient descent on riemannian manifolds. IEEE Transactions on Automatic Control, 58(9):2217-2229, 2013. 6

[2] Pierre-Andre Brousseau and Sebastien Roy. Calibration of axial fisheye cameras through generic virtual central models. In Proceedings of the IEEE/CVF International Conference on Computer Vision (ICCV), October 2019. 2

[3] James W. Cannon, William J. Floyd, Richard Kenyon, Walter, and R. Parry. Hyperbolic geometry. In In Flavors of geometry, pages 59-115, 1997. 3

[4] L. Chen, G. Papandreou, I. Kokkinos, K. Murphy, and A. L. Yuille. Deeplab: Semantic image segmentation with deep convolutional nets, atrous convolution, and fully connected crfs. IEEE Transactions on Pattern Analysis and Machine Intelligence, 40(4):834-848, 2018. 2

[5] Benjamin Coors, Alexandru Paul Condurache, and Andreas Geiger. Spherenet: Learning spherical representations for detection and classification in omnidirectional images. In Computer Vision-ECCV 2018, pages 525-541. Springer International Publishing, 2018. 3

[6] J. Dai, H. Qi, Y. Xiong, Y. Li, G. Zhang, H. Hu, and Y. Wei. Deformable convolutional networks. In 2017 IEEE International Conference on Computer Vision (ICCV), pages 764-773, 2017. 2, 3, 5, 7

[7] L. Deng, M. Yang, H. Li, T. Li, B. Hu, and C. Wang. Restricted deformable convolution-based road scene semantic segmentation using surround view cameras. IEEE Transactions on Intelligent Transportation Systems, 21(10):4350-4362, 2020. 1, 3, 5, 6, 7

[8] Fred'eric Devernay and Olivier Faugeras. Straight lines have to be straight. Machine Vision and Applications, 13(1):14-24, 2001. 2

[9] Octavian Ganea, Gary Becigneul, and Thomas Hofmann. Hyperbolic Neural Networks. In S. Bengio, H. Wallach, H. Larochelle, K. Grauman, N. Cesa-Bianchi, and R. Garnett, editors, Advances in Neural Information Processing Systems 31, pages 5345-5355. Curran Associates, Inc., 2018. 2, 4, 6

[10] P. Goodarzi, M. Stellmacher, M. Paetzold, A. Hussein, and E. Matthes. Optimization of a cnn-based object detector for fisheye cameras. In 2019 IEEE International Conference on Vehicular Electronics and Safety (ICVES), pages 1-7, 2019. 3

[11] S. Hrabar, G. S. Sukhatme, P. Corke, K. Usher, and J. Roberts. Combined optic-flow and stereo-based navigation of urban canyons for a uav. In 2005 IEEE/RSJ International Conference on Intelligent Robots and Systems, pages 3309-3316, 2005. 1

[12] Y. Jeon and J. Kim. Active convolution: Learning the shape of convolution for image classification. In 2017 IEEE Conference on Computer Vision and Pattern Recognition (CVPR), pages 1846-1854, 2017. 2

[13] Juho Kannala and Sami S. Brandt. A generic camera model and calibration method for conventional, wide-angle, and fish-eye lenses. IEEE Transactions on Pattern Analysis and Machine Intelligence, 22(8):1335-1340, 2006. 1, 2, 3

[14] H. Kim, E. Chae, G. Jo, and J. Paik. Fisheye lens-based surveillance camera for wide field-of-view monitoring. In 2015 IEEE International Conference on Consumer Electronics (ICCE), pages 505-506, 2015. 1

[15] Li Liu, Wanli Ouyang, Xiaogang Wang, Paul Fieguth, Jie Chen, Xinwang Liu, and Matti Pietikainen. Deep learning ˜ for generic object detection: A survey. International Journal of Computer Vision, 128(2):261-318, 2020. 2

[16] R. Melo, M. Antunes, J. P. Barreto, G. Falcao, and N. ˜ Gonçalves. Unsupervised intrinsic calibration from a single frame using a "plumb-line" approach. In 2013 IEEE International Conference on Computer Vision, pages 537-544, 2013. 2

[17] Mi Zhang, Jian Yao, Menghan Xia, Kai Li, Yi Zhang, and Yaping Liu. Line-based multi-label energy optimization for fisheye image rectification and calibration. In 2015 IEEE Conference on Computer Vision and Pattern Recognition (CVPR), pages 4137-4145, 2015. 2

[18] S. Ramalingam and P. Sturm. A unifying model for camera calibration. IEEE Transactions on Pattern Analysis and Machine Intelligence, 39(7):1309-1319, 2017. 2

[19] D. Schmalstieg and T. Hollerer. Augmented reality: Princi-¨ples and practice. In 2017 IEEE Virtual Reality (VR), pages 425-426, 2017. 1

[20] Y. Su and K. Grauman. Kernel transformer networks for compact spherical convolution. In 2019 IEEE/CVF Conference on Computer Vision and Pattern Recognition (CVPR), pages 9434-9443, 2019. 3

[21] Abraham Albert Ungar. A Gyrovector Space Approach to Hyperbolic Geometry. Synthesis Lectures on Mathematics and Statistics, 1(1):1-194, 2008. 3

[22] Z. Xue, N. Xue, G. Xia, and W. Shen. Learning to calibrate straight lines for fisheye image rectification. In 2019 IEEE/CVF Conference on Computer Vision and Pattern Recognition (CVPR), pages 1643-1651, 2019. 2

[23] Yaozu Ye, Kailun Yang, Kaite Xiang, Juan Wang, and Kaiwei Wang. Universal semantic segmentation for fisheye urban driving images, 2020. 3

[24] Xiaoqing Yin, Xinchao Wang, Jun Yu, Maojun Zhang, Pascal Fua, and Dacheng Tao. FishEyeRecNet: A Multi-context Collaborative Deep Network for Fisheye Image Rectification. In Vittorio Ferrari, Martial Hebert, Cristian Sminchisescu, and Yair Weiss, editors, Computer Vision-ECCV 2018, pages 475-490, Cham, 2018. Springer International Publishing. 1

[25] Senthil Yogamani, Ciaran Hughes, Jonathan Horgan, Ganesh Sistu, Padraig Varley, Derek O'Dea, Michal Uricar, Stefan Milz, Martin Simon, Karl Amende, Christian Witt, Hazem Rashed, Sumanth Chennupati, Sanjaya Nayak, Saquib Mansoor, Xavier Perrotton, and Patrick Perez. Woodscape: A multi-task, multi-camera fisheye dataset for autonomous driving. In Proceedings of the IEEE/CVF International Conference on Computer Vision (ICCV), October 2019. 1, 2, 3

What is claimed is:

1. A method for providing a trained deep neural network to extract features from images acquired by ultrawide field of view (FOV) sensors, the method being executed by a processor, the method comprising:
obtaining a deep neural network, the deep neural network comprising a set of convolutional layers each associated with respective kernels, the set of convolution layers comprising at least one convolution layer associated with a deformable kernel;
obtaining a training dataset comprising a plurality of ultrawide field of view images, each of the plurality of ultrawide field of view images being associated with at least one respective object class label;
training the deep neural network to perform object recognition on the training dataset to thereby obtain a trained deep neural network, said training comprising:
extracting, by using at least one of the set of convolution layers, for a given ultrawide field of view image, a set of features indicative of at least spatial relations in the given ultrawide field of view image;
projecting the set of features into a manifold space to obtain a set of projected features;
generating, by using a non-Euclidian convolution layer in manifold space on the set of projected features, a set of geometric features indicative of ultrawide field of view image properties in manifold space;
generating, by using at least another convolution layer of the set of convolution layers and the set of geometric features, a set of distorted features indicative of ultrawide field of view image properties in Euclidian space;
generating, for the given ultrawide field of view image, by using the set of distorted features, at least one object class prediction; and
updating, based on the at least one object class prediction and the at least one respective object class label, at least a portion of the deep neural network comprising the deformable kernel to obtain a learned deformable kernel;
providing the trained deep neural network, the trained deep neural network comprising the set of convolutional layers comprising the at least one convolution layer associated with the learned deformable kernel.

2. The method of claim 1, wherein
object recognition comprises semantic segmentation; wherein
the at least one respective object class label comprises a respective segmentation map; and wherein
the at least one object class prediction comprises a pixel-wise class prediction.

3. The method of claim 1, wherein the manifold space comprises a hyperbolic space.

4. The method of claim 3, wherein said projecting the set of features into a manifold space to obtain a set of projected features comprises using a Poincaré ball model.

5. The method of claim 4, further comprising, after said generating, by using the non-Euclidian convolution layer in the manifold space on the set of projected features, the set of geometric features indicative of ultrawide field of view image properties in the manifold space:
projecting back the set of geometric features into Euclidian space to obtain deformable kernel values; and wherein said generating, by using at least another convolution layer of the set of convolution layers and the set of geometric features, the set of distorted features indicative of ultrawide field of view image properties in Euclidian space comprises using the deformable kernel values to generate the set of distorted features.

6. The method of claim 1, further comprising, prior to said extracting, for the given ultrawide field of view image, by using at least one the set of convolution layers, the set of features:
generating, using the given ultrawide field of view image, a graph representation thereof to be used to extract the set of features therefrom.

7. The method of claim 1, wherein said updating comprises using backpropagation.

8. The method of claim 1, wherein said updating comprises using a reconstruction loss as an objective function.

9. The method of claim 1, wherein the deep neural network has an encoder-decoder architecture.

10. The method of claim 1, wherein the plurality of ultrawide field of view images comprise a field of view between 180 degrees and 360 degrees.

11. A method of training a further deep neural network to perform image recognition according to claim 10, the method comprising:
obtaining respective learned kernels and the learned deformable kernel;
obtaining the further deep neural network;
fitting the further deep neural network by using the respective learned kernels and the learned deformable kernel to obtain a fitted deep neural network;
obtaining another plurality of ultrawide field of view images, each of the another plurality of ultrawide field of view images being labelled with an object recognition label; and
training the fitted deep neural network to perform image recognition on the another plurality of ultrawide field of view images to thereby obtain another trained deep neural network adapted to perform image recognition on ultrawide field of view images.

12. The method of claim 11, wherein said fitting comprises using bilinear interpolation.

13. The method of claim 12, wherein image recognition comprises one of object detection and semantic segmentation.

14. A system for providing a trained deep neural network to extract features from images acquired by ultrawide field of view (FOV) sensors, the system being executed by a processor, the system comprising:
a processor;
a non-transitory storage medium operatively connected to the processor, the non-transitory storage medium comprising computer-readable instructions;
the processor, upon executing the instructions, being configured for:
obtaining a deep neural network, the deep neural network comprising a set of convolutional layers each associated with respective kernels, the set of convolution layers comprising at least one convolution layer associated with a deformable kernel;
obtaining a training dataset comprising a plurality of ultrawide field of view images, each of the plurality of ultrawide field of view images being associated with at least one respective object class label;
training the deep neural network to perform object recognition on the training dataset to thereby obtain a trained deep neural network, said training comprising:

extracting, by using at least one of the set of convolution layers, for a given ultrawide field of view image, a set of features indicative of at least spatial relations in the given ultrawide field of view image;

projecting the set of features into a manifold space to obtain a set of projected features;

generating, by using a non-Euclidian convolution layer in manifold space on the set of projected features, a set of geometric features indicative of ultrawide field of view image properties in manifold space;

generating, by using at least another convolution layer of the set of convolution layers and the set of geometric features, a set of distorted features indicative of ultrawide field of view image properties in Euclidian space;

generating, for the given ultrawide field of view image, by using the set of distorted features, at least one object class prediction; and updating, based on the at least one object class prediction and the at least one respective object class label, at least a portion of the deep neural network comprising the deformable kernel to obtain a learned deformable kernel; and providing the trained deep neural network, the trained deep neural network comprising the set of convolutional layers comprising the at least one convolution layer associated with the learned deformable kernel.

15. The system of claim 14, wherein object recognition comprises semantic segmentation; wherein the at least one respective object class label comprises a respective segmentation map; and wherein the at least one object class prediction comprises a pixel-wise class prediction.

16. The system of claim 14, wherein the manifold space comprises a hyperbolic space.

17. The system of claim 16, wherein said projecting the set of features into a manifold space to obtain a set of projected features comprises using a Poincaré ball model.

18. The system of claim 17, wherein the processor is further configured for, after said generating, by using the non-Euclidian convolution layer in the manifold space on the set of projected features, the set of geometric features indicative of ultrawide field of view image properties in the manifold space:

projecting back the set of geometric features into Euclidian space to obtain deformable kernel values; and wherein said generating, by using at least another convolution layer of the set of convolution layers and the set of geometric features, the set of distorted features indicative of ultrawide field of view image properties in Euclidian space comprises using the deformable kernel values to generate the set of distorted features.

19. The system of claim 14, wherein the processor is further configured for, prior to said extracting, for the given ultrawide field of view image, by using at least one the set of convolution layers, the set of features:

generating, using the given ultrawide field of view image, a graph representation thereof to be used to extract the set of features therefrom.

20. The system of claim 14, wherein said updating comprises using backpropagation.

21. The system of claim 14, wherein said updating comprises using a reconstruction loss as an objective function.

22. The system of claim 14, wherein the deep neural network has an encoder-decoder architecture.

23. The system of claim 14, wherein the plurality of ultrawide field of view images comprise a field of view between 180 degrees and 360 degrees.

24. A system of training a further deep neural network to perform image recognition according to claim 23, the system comprising:

obtaining respective learned kernels and the learned deformable kernel;

obtaining the further deep neural network;

fitting the further deep neural network by using the respective learned kernels and the learned deformable kernel to obtain a fitted deep neural network;

obtaining another plurality of ultrawide field of view images, each of the another plurality of ultrawide field of view images being labelled with an object recognition label; and training the fitted deep neural network to perform image recognition on the another plurality of ultrawide field of view images to thereby obtain another trained deep neural network adapted to perform image recognition on ultrawide field of view images.

25. The system of claim 24, wherein said fitting comprises using bilinear interpolation.

26. The system of claim 25, wherein image recognition comprises one of: object detection and semantic segmentation.

* * * * *